(12) United States Patent
Chung et al.

(10) Patent No.: US 10,611,388 B2
(45) Date of Patent: Apr. 7, 2020

(54) POSITIVE TRAIN CONTROL SYSTEM AND METHOD

(71) Applicant: Panasec Corporation, Princeton Junction, NJ (US)

(72) Inventors: Kevin Kwong-Tai Chung, Princeton, NJ (US); Albert Han-Ping Chung, Princeton, NJ (US); Yulin Huang, East Windsor, NJ (US); Dexi Zhu, New York, NY (US)

(73) Assignee: Avante International Technology, Inc., Princeton Junction, NJ (US)

( * ) Notice: Subject to any disclaimer, the term of this patent is extended or adjusted under 35 U.S.C. 154(b) by 235 days.

(21) Appl. No.: 15/834,860

(22) Filed: Dec. 7, 2017

(65) Prior Publication Data

US 2018/0093685 A1   Apr. 5, 2018

Related U.S. Application Data

(62) Division of application No. 15/626,789, filed on Jun. 19, 2017, now Pat. No. 10,315,673, which is a
(Continued)

(51) Int. Cl.
*B61L 23/04* (2006.01)
*B61L 25/02* (2006.01)
(Continued)

(52) U.S. Cl.
CPC ............ *B61L 23/047* (2013.01); *B61L 3/008* (2013.01); *B61L 15/0027* (2013.01);
(Continued)

(58) Field of Classification Search
CPC .... B61L 23/047; B61L 3/008; B61L 15/0027; B61L 23/041; B61L 23/14; B61L 23/16
See application file for complete search history.

(56) References Cited

U.S. PATENT DOCUMENTS 3,857,183 A   12/1974   Plasser et al.
4,235,112 A   11/1980   Kaiser
(Continued)

FOREIGN PATENT DOCUMENTS

CN   102514601   6/2012
DE   102006007788   8/2007
(Continued)

OTHER PUBLICATIONS

International Searching Authority/US, "International Search Report and Written Opinion" International Application No. PCT/US2018/016478, dated Apr. 23, 2018, 8 pgs.
(Continued)

*Primary Examiner* — Michael D Lang
(74) *Attorney, Agent, or Firm* — Clement A. Berard, Esq.; Dann, Dorfman, Herrell & Skillman, PC

(57) ABSTRACT

A positive train control system and method may comprise one or more switch monitors and/or one or more track monitors providing sensor data relative to one or more switches and/or one or more tracks, respectively, determining whether there is an anomaly of a switch or track, and when there is, providing a message, alert and/or warning, and/or initiating a train control action. Determination of an anomaly may be preformed on a train or at a remote location, e.g., a central facility.

24 Claims, 13 Drawing Sheets

Related U.S. Application Data division of application No. 15/226,972, filed on Aug. 3, 2016, now Pat. No. 9,937,938, which is a division of application No. 14/817,836, filed on Aug. 4, 2015, now Pat. No. 9,434,397.

(60) Provisional application No. 62/071,297, filed on Sep. 19, 2014, provisional application No. 62/070,141, filed on Aug. 15, 2014, provisional application No. 61/999,742, filed on Aug. 5, 2014.

(51) Int. Cl.
| | |
|---|---|
| B61L 23/14 | (2006.01) |
| B61L 3/00 | (2006.01) |
| B61L 15/00 | (2006.01) |
| B61L 23/16 | (2006.01) |
| B61L 27/00 | (2006.01) |
| B61L 27/04 | (2006.01) |

(52) U.S. Cl.
CPC .......... *B61L 23/041* (2013.01); *B61L 23/14* (2013.01); *B61L 23/16* (2013.01); *B61L 25/021* (2013.01); *B61L 25/025* (2013.01); *B61L 27/0005* (2013.01); *B61L 27/0038* (2013.01); *B61L 27/04* (2013.01); *B61L 15/0054* (2013.01); *B61L 15/0072* (2013.01); *B61L 2201/00* (2013.01); *B61L 2205/04* (2013.01)

(56) References Cited

U.S. PATENT DOCUMENTS

| | | | |
|---|---|---|---|
| 5,253,830 | A | 10/1993 | Nayer et al. |
| 5,529,267 | A | 6/1996 | Giras et al. |
| 5,978,718 | A | 11/1999 | Kull |
| 7,577,502 | B1 | 8/2009 | Henry |
| 9,434,397 | B2 | 9/2016 | Chung et al. |
| 2002/0010531 | A1 | 1/2002 | Hawthorne et al. |
| 2003/0236598 | A1* | 12/2003 | Villarreal Antelo ........ B61L 25/025 701/19 |
| 2005/0125113 | A1 | 6/2005 | Wheeler |
| 2007/0162199 | A1 | 7/2007 | Katsuta et al. |
| 2007/0217670 | A1 | 9/2007 | Bar-Am |
| 2008/0303656 | A1 | 12/2008 | Matthews, Jr. et al. |
| 2010/0088914 | A1 | 4/2010 | Cerwin |
| 2012/0018591 | A1 | 1/2012 | Ghaly |
| 2013/0297199 | A1 | 11/2013 | Kapp et al. |
| 2015/0009331 | A1 | 1/2015 | Venkatraman |
| 2016/0016597 | A1 | 1/2016 | Morris |
| 2016/0046308 | A1 | 2/2016 | Chung et al. |
| 2016/0339934 | A1 | 11/2016 | Chung et al. |
| 2017/0349194 | A1 | 12/2017 | Chung et al. |

FOREIGN PATENT DOCUMENTS

| | | |
|---|---|---|
| EP | 1236634 | 9/2002 |
| WO | 2011/162605 | 12/2011 |

OTHER PUBLICATIONS

European Patent Office, "Supplementary European Search Report", European Application No. 15829433, dated Feb. 28, 2018, 9 pgs.

Michael David, Protran Technology, "Real-time monitoring keeps an eye on rail defects", Aug. 29, 2014, 4 pages.

Protran Technology, "Collision Avoidance System™ Vehicle to Vehicle and Vehicle to Worker Advance Warning", Sep. 19, 2014, 3 pages.

Protran Technology, "Emergency Engine Stop™ Shuttle Wagon/Locomotive Wireless Engine Stop", Sep. 18, 2014, 3 pages.

Protran Technology, "Intelligent Rail Integrity System (IRIS)™ Rail Neutral Monitoring System", Sep. 18, 2014, 3 pages.

Protran Technology, "Protracker™ PTC—Roadway Worker Protection System Track Walker/Worker—Train Operator—Advance Warning Devices", Sep. 18, 2014, 3 pages.

Jurgen Dickmann et al., "Making Bertha See", North American, Aug. 2014, pp. 44-49.

The Federal Register, "Positive Train Control Systems (RRR)", a Rule by the Federal Railroad Administration, the Daily Journal of the United States Government, Aug. 22, 2014, 63 pages.

William C. Vantuono, Editor-in-Chief, "Protran lands collision avoidance system contracts", http://www.railwayage.com/index.php/communications/protran-lands-collision-avoidance-system-contracts.html, Jul. 30, 2014, 1 page.

Mischa Wanek-Libman, Engineering Editor, "Exemptions expanded in FRA's final PTC rule", http://www.railwayage.com/index.php/ptc/exemptions-expanded-in-fras-final-ptc-rule.html, Aug. 22, 2014, 1 page.

International Searching Authority/US, "International Search Report and Written Opinion" International Application No. PCT/US2015/043736, dated Dec. 28, 2015, 17 pgs.

\* cited by examiner

POSITIVE TRAIN CONTROL SYSTEM AND METHOD

This Application is a division of U.S. patent application Ser. No. 15/626,789 entitled "POSITIVE TRAIN CONTROL SYSTEM, APPARATUS AND METHOD" filed Jun. 19, 2017, which is a division of U.S. patent application Ser. No. 15/226,972 entitled "POSITIVE TRAIN CONTROL APPARATUS" filed Aug. 3, 2016, which is a division of U.S. patent application Ser. No. 14/817,836 entitled "POSITIVE TRAIN CONTROL SYSTEM AND APPARATUS THEREFOR" filed Aug. 4, 2015, which claims the benefit of each of U.S. Provisional Patent Application No. 61/999,742 entitled "POSITIVE TRAIN CONTROL SYSTEM BASED ON GEO-TAGGED DATA" filed Aug. 5, 2014, of U.S. Provisional Patent Application No. 62/070,141 entitled "POSITIVE TRAIN CONTROL SYSTEM BASED ON GEO-TAGGED DATA" filed Aug. 15, 2014, and of U.S. Provisional Patent Application No. 62/071,297 entitled "POSITIVE TRAIN CONTROL SYSTEM BASED ON GEO-TAGGED DATA" filed Sep. 19, 2014, each of which is hereby incorporated herein by reference in its entirety.

The present invention relates to train control and, in particular, to a train control system and/or method.

Trains have been and continue to be a substantial, viable and economical means for transporting cargo and passengers, especially over short to medium distances where air travel is either too expensive or inconvenient, e.g., due to travel to and from airports outside of cities and delays due to security procedures. Hundreds of thousands or millions of people travel on commuter trains, regional rail lines, metros and subway trains each day, and so safety is of great importance.

Collisions with objects on the track and derailments appear to be the two most common sorts of train accidents, and in many cases occur together. Track conditions, e.g., improper switch position and/or incomplete switch transfer, and track distortion, often contribute to such accidents, which often cause personal injury and death, spills and releases dangerous to health and/or the environment, and damage to property both along the track and some distance from the track.

Often scores or hundreds of people are injured or killed or placed at risk, hazardous and/or dangerous chemicals have been released, and even entire neighborhoods and towns have been damaged or have had to be evacuated. The economic damage can easily rise into the millions of dollars from even what might appear to be a relatively "minor" accident.

Early on, control of train movement was by a system of geographically "fixed blocks" of track in which each block or length of track would have to be clear of trains before another train was allowed to enter the fixed block, e.g., as illustrated in FIG. 1. Signaling and switching was manually controlled at first, e.g., by a dispatcher in a wayside tower, and later was automated to some degree as technology advanced. Typically the geographic blocks were large and so track utilization was low, but it worked relatively well if the travel direction and speed of the trains was similar, the track was in good condition, and there was no human error of the part of the train operators and the dispatchers. Because trains operated based upon what was supposed to be the track situation ahead, actual conditions often deviated what was supposed to be, and accidents were frequent and often disastrous.

An improved approach was the introduction of a "moving block" system where the block was not geographically fixed, but each "block" moved with the train in that moving block and had a length predetermined by train speed, stopping distance, speed limits, wayside sensors and central control capabilities.

One approach to reducing the risk of such accidents has been to mandate so-called "positive train control" as is required by the "Rail Safety Improvement Act of 2008" which was enacted in the United States. Among the intended safety benefits are maintaining train separation, avoiding collisions, enforcing line speed, implementing temporary speed restrictions and improving rail worker wayside safety. One result has been the increase in computer based train control that is understood to rely on centralized computers that employ radio communication to monitor train movement and track conditions, however, these have tended to continue the dynamic moving block approach, also known as virtual block or flexible block, that defines a safety envelope or block that moves along with the train.

Conventional approaches to positive train control that rely on reporting to a central computer or facility the position and operation of individual trains, the accumulation and monitoring of data relating to the trains operating on the rail system, track and wayside data, and the like, and the communication of that data and operating orders to all of the trains. This complex system necessarily relies on a complex communication system that must interconnect all of the trains and all of the various wayside and track sensors for the continuous transmission of data and status information from all system elements to the central computer and for communicating coordinating data, operating instructions, alerting and control instructions to all of the trains and all of the system elements and sensors. Not only does this system necessarily complicate the communications system requirements, e.g., for achieving suitable reliability, accuracy and redundancy, but it also necessarily requires massive reliable and redundant central computing resources.

Because such system, e.g., a centrally controlled moving block system, must be "failsafe" in that any failure of equipment and/or communication must be quickly responded to by placing the entire railroad and all trains thereon into a safe operating condition. This is usually implemented by reverting to an absolute block operation wherein train speeds are substantially reduced, e.g., to 25 mph where wayside signals are not present or are not operating and to under 50 mph where wayside signals are present and are operating, and train separation is substantially increased, thereby substantially reducing the capacity and efficiency of the entire affected rail system.

Applicant believes there may be a need for a train control system and related apparatus that provides a less complex and less costly alternative to the complex and costly prior art centrally controlled train management systems, and that can function even when communication between a central facility and a train or trains is disrupted or lost or absent.

Applicant also believes there may be a need for a train control apparatus or unit that provides a less complex and less costly alternative.

A positive train control system for a train movable on a track way may comprise: one or more switch monitors disposed at one or more locations along a track way proximate a switch of the track way, or one or more track monitors disposed at one or more locations proximate a track of the track way, or a combination thereof; each of the switch monitors includes a sensor providing sensor data relating to a physical condition of one or more switches of the track way proximate to the switch monitor and includes a communication device for transmitting the switch monitor sensor data and switch monitor location data representative of the location of the switch monitor. A processor is configured to receive and process the switch monitor sensor data and the switch monitor location data to determine when there is an anomaly of the switch and the location thereof; each of the track monitors includes a sensor providing sensor data relating to a physical condition of one or more tracks of the track way proximate to the track monitor and includes a communication device for transmitting the track monitor sensor data and track monitor location data representative of the location of the track monitor; the processor is configured to receive and process the track monitor sensor data and track monitor location data to determine when there is an anomaly of the track and the location thereof; the processor generates a message, alert and/or warning when an anomaly of the switch and/or an anomaly of the track is determined; and an operator alert device on the train is responsive to the message, alert and/or warning for providing a human perceivable representation of the message, alert and/or warning; wherein the processor communicates the message, alert and/or warning to the operator alert device on the train, or communicates a control signal to a train control to at least adjust the speed of the train, or communicates the message, alert and/or warning to a remote location, or communicates any combination of the foregoing.

A positive train control method for a train movable on a track way may comprise: disposing one or more switch monitors at one or more locations along a track way proximate a switch of the track way, or disposing one or more track monitors at one or more locations proximate a track of the track way, or a combination thereof; for each of the switch monitors, providing sensor data relating to a physical condition of one or more switches of the track way proximate to the switch monitor and transmitting the switch monitor sensor data and switch monitor location data representative of the location of the switch monitor; receiving and processing the switch monitor sensor data and the switch monitor location data to determine when there is an anomaly of the switch and the location thereof; for each of the track monitors, providing sensor data relating to a physical condition of one or more tracks of the track way proximate to the track monitor and transmitting the track monitor sensor data and track monitor location data representative of the location of the track monitor; receiving and processing the track monitor sensor data and the track monitor location data to determine when there is an anomaly of the track and the location thereof; generating a message, alert and/or warning when an anomaly of the switch and/or an anomaly of the track is determined; and providing a human perceivable representation of the message, alert and/or warning via an operator alert device on the train responsive to the message, alert and/or warning; communicating the message, alert and/or warning to the operator alert device on the train, or communicating a control signal to a train control to at least adjust the speed of the train, or communicating the message, alert and/or warning to a remote location, or communicating any combination of the foregoing.

Accordingly, a positive train control unit mountable on a train may comprise: a plurality of different sensors selected from the group including a visual imager, an infrared imager, a radar, a doppler radar, a laser sensor, a laser ranging device, an acoustic sensor, and/or an acoustic ranging device; a locating device including a global positioning device and/or an inertial navigation device to provide location data; a processor to associate data sensed by the plurality of different sensors with location data and with time data; a data receiver configured to receive data from a track monitor, a switch monitor and/or from a wayside monitor; the processor determining its location, speed and direction relative to predetermined track way configuration data; the processor determining whether there is an anomaly the track way; and if the processor determines that the location, speed and/or direction of the positive train control unit differs the train routing order, and/or that there is an anomaly in the track way, then the processor communicates an alert to an alerting device and/or communicates a control signal to a train control to at least adjust the speed of the train.

Further, a positive train control unit for a track way may comprise: a plurality of different sensors having respective fields of view in a predetermined direction; a processor that associates data sensed by the plurality of different sensors with location data and time data; a data receiver to couple data from one or more monitors to the processor; a communication device; the processor determining from data from the plurality of different sensors, location data, and data from the data receiver, the location of the positive train control unit relative to track way data; the processor determining whether there is an anomaly of the track way; and if the processor determines that there is an anomaly in the track way; then the processor causes an alert regarding an anomaly in the track way via the communication device.

According to another aspect, a train control unit may comprise: an elongated member attached to a first rail of a track way; a probe near the other end of the elongated member; a sensor device attached to a second rail of the track way and including a position sensor for sensing the position of the probe relative to the sensor device; wherein the probe and the position sensor cooperate to determine the position of the elongated member relative to the sensor device.

According to yet another aspect, a positive train control method may comprise:
  receiving sensor data from a plurality of different sensors selected from the group including a visual imager, an infrared imager, a radar, a doppler radar, a laser sensor, a laser ranging device, an acoustic sensor, and an acoustic ranging device;
  receiving location data from a locating device that determines the location of the train;
  associating the sensor data with location data and time data, whereby the sensor data is geo-tagged and time-tagged;
  receiving data from a track monitor, or from a switch monitor, and/or from a wayside monitor, if within range thereof;
  determining from the sensor data and location data, the location, speed and direction of the train relative to predetermined data;
  determining from data, if any, received from a track monitor, switch monitor, and/or wayside monitor, whether there is an anomaly in the track way; and
    (1) if determined that the location, speed and/or direction of the train differs from the predetermined data, and/or
    (2) if determined that there is an anomaly in the track way,
  then communicating an alert to an alerting device or communicating a control signal for a train control or both.

In yet another aspect, a train control unit for a track way may comprise: a sensor device configured to provide a positive indication of the position of a switch rail relative to a stock rail independently of the switching system, the sensor device including a one or more position sensors and probes configured to determine switch closure; and a communication device configured to communicate the positive indication of closure of the switch rail to the stock rail to a remote receiver. The receiver may be at a monitoring center and/or on a train within range.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include.

Figure 1:
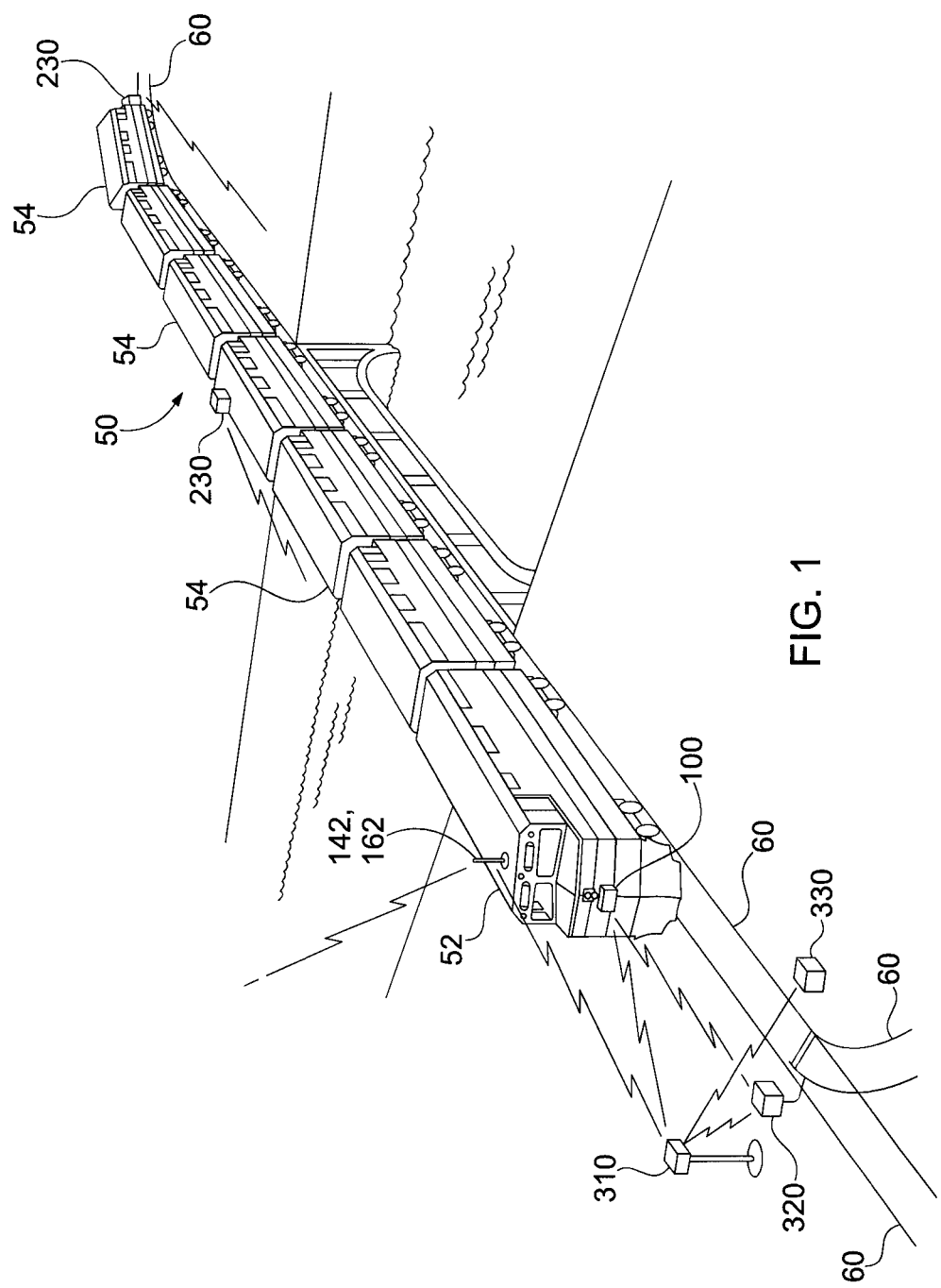
FIG. 1 is a schematic diagram illustrating an example embodiment of a positive train control unit mounted to the front of a train which is on a track way.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. According to common practice, the various features of the drawing are not to scale, and the dimensions of the various features may be arbitrarily expanded or reduced for clarity, and any value stated in any Figure is given by way of example only.

DESCRIPTION OF THE PREFERRED EMBODIMENT(S)

Figure 2:
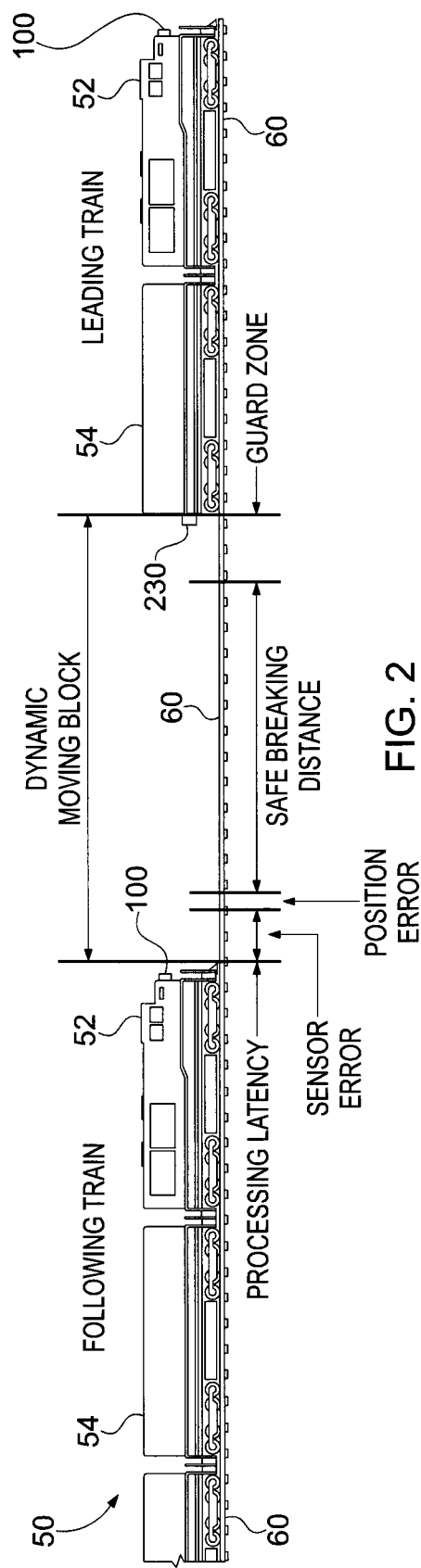
FIG. 2 is a schematic diagram illustrating an example fully moveable and adjustable block for separating trains by a safe distance determinable with the embodiment of FIG. 1.

FIG. 1 is a schematic diagram illustrating an example embodiment of a positive train control unit 100 mounted to the front of a train 50 which is on a track 60; and FIG. 2 is a schematic diagram illustrating an example fully moveable and adjustable block 70 for separating trains 50 by a safe distance determinable with the embodiment of FIG. 1. Train 50 include one or more engines or locomotives 52 (or a motorized carriage or other self-propulsive unit) and may also include one or more carriages 54, e.g., passenger cars, freight cars, gondola cars, hopper cars, flat cars, piggyback cars, container cars, cabooses, and the like. While a railroad train and a railroad track is illustrated, the present arrangement may be employed with any other type or kind of vehicle 50 operating on and/or along a guided pathway 60 of any type or kind.

Positive train control unit 100 is preferably mounted at the front of train 50 so as to have a clear field of view forward of train 50 in the direction it is traveling. Positive train control unit 100 includes various sensors (described below) of different types, e.g., visible, infrared, radar, acoustic and the like, that monitor the way ahead to detect and identify objects and/or conditions that might affect the safety of train 50 and a processor to process the data from those sensors and from other sources, so as to provide indications of conditions ahead to the train crew, e.g., including the train operator, and if the indication is a warning or alert, take appropriate action to control the train 50 if the train crew does not appropriately respond to the warning or alert in a timely manner.

It is noted that the combination of data from different types of sensors, e.g., a visible sensor that is more useful during daylight, an IR sensor that is useful during daylight and darkness, a radar that can sense through fog and precipitation, and an acoustic sensor that "hears" what the other sensors may not see, complement each other to provide a more complete and detailed assessment of what lies ahead of positive train control unit 100, including any objects, obstructions or other danger, than can any sensor individually. In addition, sensing and detection of such condition is performed automatically and continuously so as to provide substantial advance warning to the operating crew and to take appropriate action to slow and/or stop the train should the crew fail to take appropriate and timely action.

Among the other sources and/or sensors can be one or more train monitors 230 mounted at predetermined locations on the train 50. A train monitor 230 is typically provided on the last car of the train to communicate, preferably wirelessly communicate, e.g., its location to positive train control unit 100 so that the length of train 50 can be determined and monitored, whereby a loss of integrity, e.g., a decoupling of cars, can be detected. Such train monitor may include one or more imagers to provide visibility along track 60 in the direction rearward of train 50.

One or more train monitors 230 may be placed on one or more cars along train 50, e.g., as where such car may need special monitoring due to, e.g., its contents, hazardous materials, high value cargo, classified cargo, need for security, and/or any other particular need.

Located along track 60 may be one or more monitoring units 310-330 that are located so as to monitor and detect abnormal conditions and/or deviations from a nominal condition. For example, a wayside monitor 310 may be provided e.g., where the track configuration is deemed to need monitoring because of its nature, e.g., a curvature and/or elevation profile that restricts the distance over which the track can be viewed, e.g., monitored by a positive train control unit 100 on a train 50, as described below. A wayside monitor 310 may also be employed to monitor unusually unstable areas, e.g., areas known to experience frequent natural changes, such as rock slides and/or flooding and the like. One or more example embodiments of a wayside monitor 310 are described below.

A switch monitor 320 may be placed on a switch to monitor the operation and, in particular, the completion of switch closure in either the straight ahead or diverting positions of the switching rails. Switch monitors 320 preferably directly sense the position of the moveable switch rails at the locations where they are supposed to be closely adjacent to fixed rails, e.g., the stock rails, to directly confirm that the switch rails have fully moved, and to do so independently of any conventional switch controls. One or more example embodiments of a switch monitor 320 are described below.

A track monitor 330 may be placed along a track to monitor the spacing and distortion of the rails, such as may result from high and/or low rail temperature, and/or from instability in the rail bed. One or more example embodiments of a track monitor 330 are described below.

While wayside monitors 310, switch monitors 320 and track monitors 330 may communicate the data they sense to a central computer and/or control facility, the monitors 310-330 described herein include local communication devices, and preferably plural local communication devices for redundancy, that communicate sensed data directly to the positive train control unit's 100 on trains 50 that are within local communication range, e.g., typically within 2-5 kilometers, as indicated by the jagged lines in FIG. 1. Such communication devices typically employ jamming and interference resistance transmission protocols and/or may operate on different bands, and may have additional transponders and/or relays associated therewith, which may be closely and/or remotely located, all so as to increase the reliability and accuracy of communication, e.g., given the geographic and topographic conditions associated with their geographic locations.

Train 50 operates in a dynamic or moving block as in FIG. 2 that sets a safe separation distance in front of train 50 and spaced from any train ahead of train 50. Because positive train control unit 100 senses track conditions ahead of train 50 and the operating conditions of train 50 and processes that data on board train 50, the separation distance for the dynamic moving block need not be established in advance or fixed in length based upon assumptions concerning train length, speed and the like, and need not rely on communication from a central train control computer or facility. Thus the moving block can truly be "dynamic" in that it can lengthen and contract based upon the actual operating conditions of train 50, e.g., speed and/or visibility distance ahead. Accordingly, train spacing can truly be "dynamic" in that it can be reduced when safe to do so, thereby to provide more efficient track utilization, and can be increased when required to maintain safe operating conditions.

The length of the moving block, e.g., the safe train separation distance, is determined by the combination of safe breaking distance based upon the actual speed of train 50 and actual track conditions, an allowance for error in the determination of the location of train 50, the processing time required by positive train control unit 100, and a guard zone between trains. Because positive train control unit 100 aboard train 50 receives sensor data in real time from on-board sensors, there is no need for communication with a central train control computer in order to maintain safe operation, and so there is no need for the length of the moving block to include an allowance for office or centralized processing time and/or for communication times to and from a central train control facility.

Figure 3:
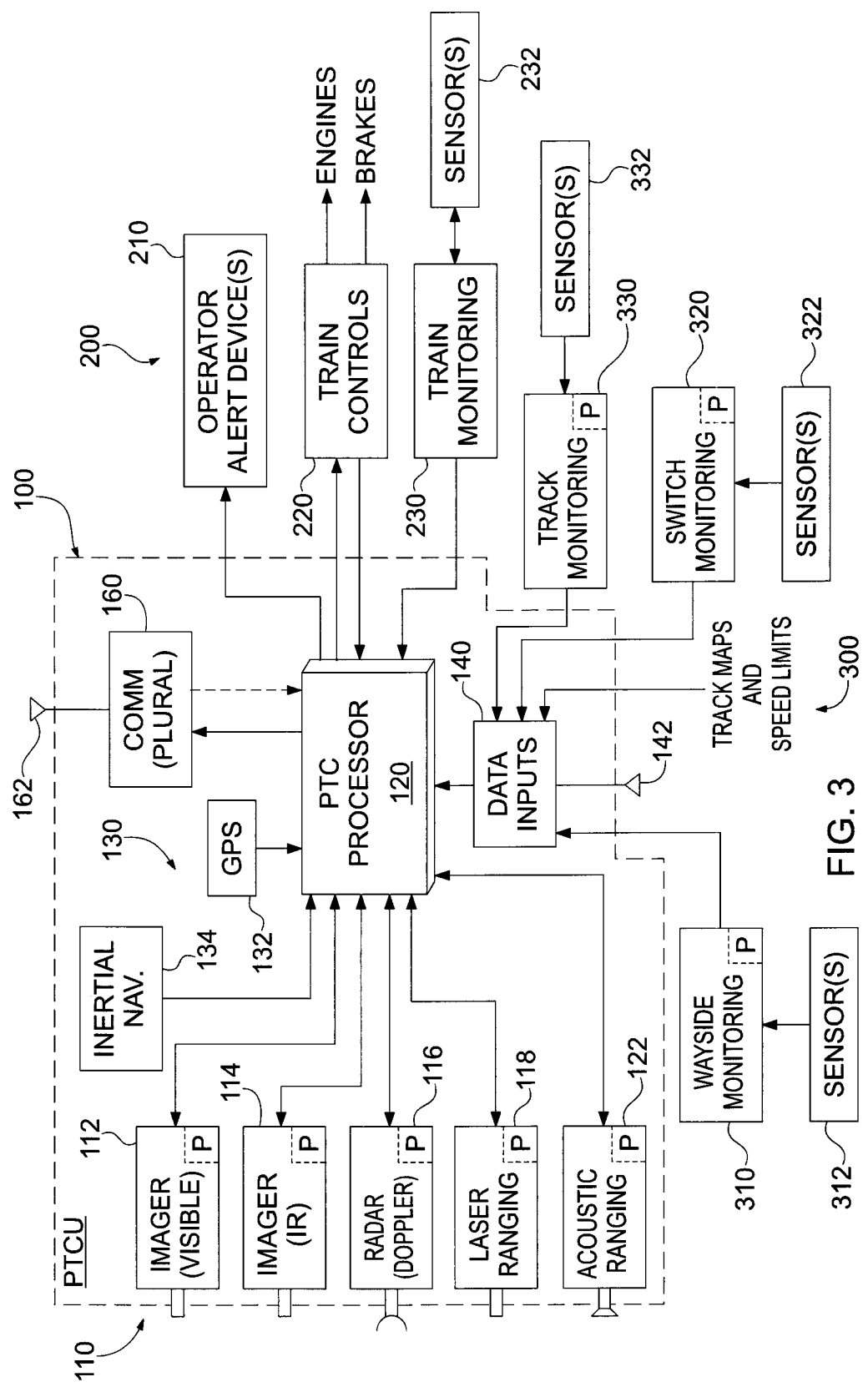
FIG. 3 is a schematic block diagram of an example embodiment of a positive train control unit suitable for mounting to a train.
Figure 4:
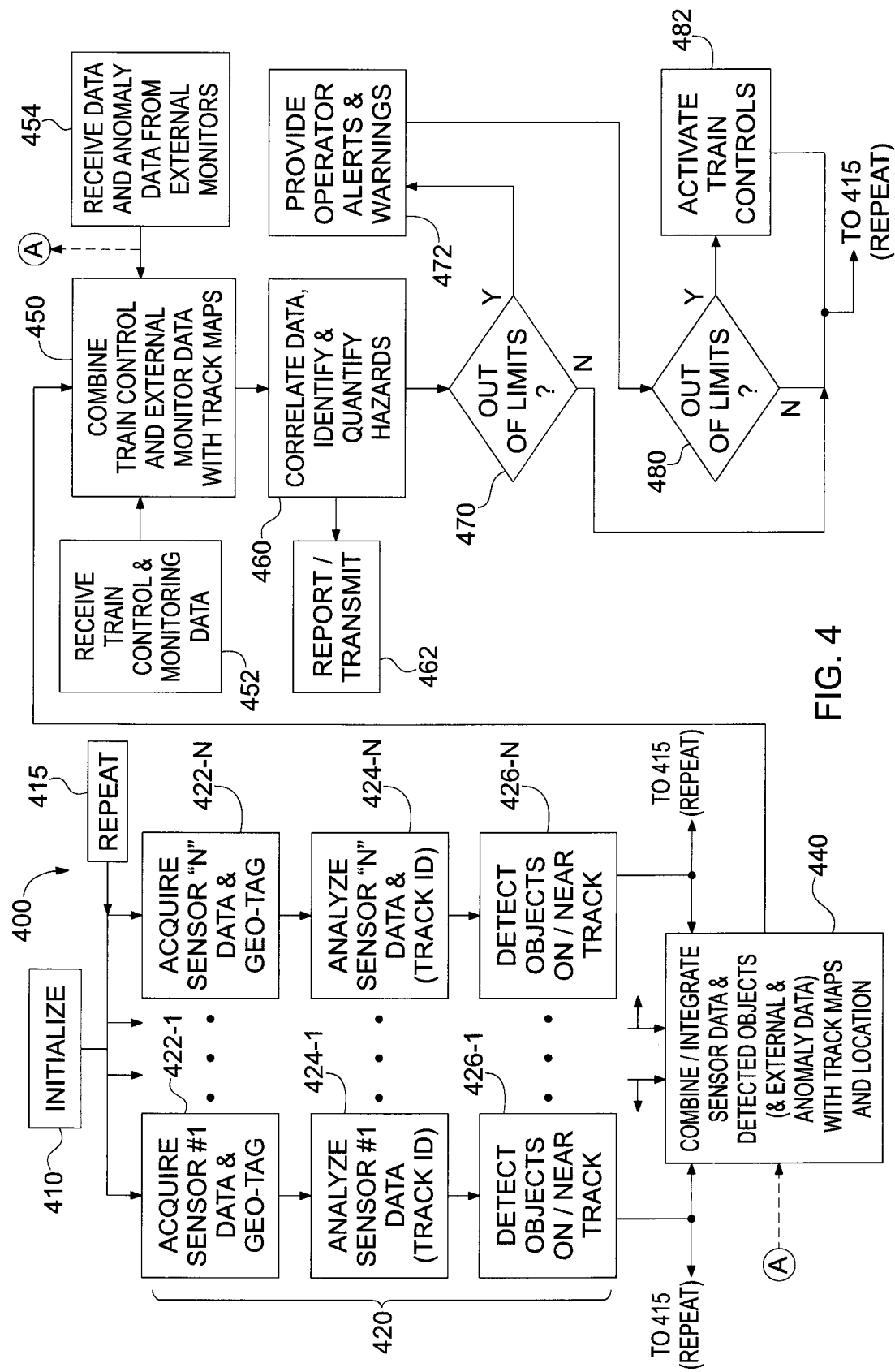
FIG. 4 is a schematic flow diagram illustrating operation of the example embodiment of FIG. 3.

FIG. 3 is a schematic block diagram of an example embodiment of a positive train control unit 100 suitable for mounting to a train; and FIG. 4 is a schematic flow diagram illustrating operation of the example embodiment of positive train control unit 100 of FIG. 3. Positive train control unit 100 includes a positive train control processor 110 comprising one or more microprocessors, microcontrollers, microcomputers, portable computers and the like, to provide one or more computing engines, memory (e.g., including random access and/or other volatile or non-volatile memory), input/output (I/O) ports, and data storage (e.g., including magnetic and/or optical drives, and/or large scale solid state semiconductor memory). Processor 100 receives data inputs from other elements of positive train control unit 100 including but not limited to one or more forward-looking sensors 110, one or more locating devices 130, one or more data input devices 140 and one or more communication devices 160, of various types and configurations. Preferably, a unique identifier is stored in a memory, e.g., the memory of processor 120, of each positive train control unit 100 so as to uniquely identify that positive train control unit and by association the train on which it is mounted on any track or railway.

Positive train control unit 100 may be configured as an assembled unit that may be mounted or attached, either temporarily or permanently, to a movable vehicle, e.g., a train, or may be in one or more modules or units of equipment that are mounted to the train, and in either case interconnected therewith. Preferably the positive train control unit 100 is mounted to the train at the forward most end thereof where it will have a suitably clear field of view forward of the train and so be able to observe and/or sense what, if anything, lies ahead, and is connected to one or more train systems and/or equipment, typically via a predefined interface, e.g., using one or more electrical connectors, for receiving electrical power from the train and providing interconnections for communicating data therebetween.

Figure 5:
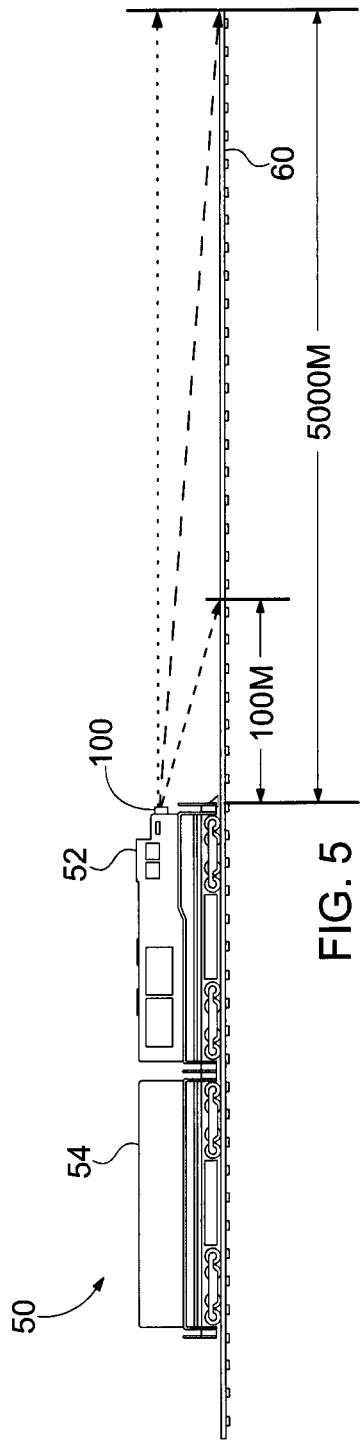
FIG. 5 is a schematic diagram illustrating various forward looking fields of view relating to the example embodiment of FIGS. 1-3.

The forward looking sensors 110 of positive train control unit 100 are positioned in positive train control unit 100 and/or are mounted to the train 50, 52 so as to have suitable fields of view substantially directly forward from the train 50, 52 on which positive train control unit 100 is mounted, as is illustrated, e.g., in FIG. 5 which is a schematic diagram illustrating various forward looking fields of view (shown therein as lines of long dashes, short dashes and dots) relating to the example embodiment of positive train control unit 100 of FIGS. 1-3. In a practical sense, sensors with a longer forward range may be, and preferably are, mounted higher up from track way 60 and sensors with shorter range may be mounted closer to track 60, in a configuration selected to make best utilization of each sensor and of the places on locomotive 52 available for mounting sensors.

Similarly, sensor field of view may also be a consideration in selecting a sensor mounting configuration.

Some of sensors 110 may be positioned to have a field of view that extends and senses far forward, e.g., 2-5 kilometers forward, of train 50 while other of sensors 110 may be directed to sense closer, e.g., 100 meters to 500 meters, forward of train 50, while still others may be directed to sense over a range of distances intermediate thereto and/or overlapping therewith. The width of the field of view vertically is typically selected to provide the desired range of forward looking distance including changes in elevation and/or inclination of the tracks 60, e.g., due to hills, overpasses, underpasses and the like, and the width of the field of view horizontally is selected to provide the desired range of forward looking distance including changes in azimuth of the tracks 60, e.g., due to right of way width, curves, parallel tracks, switch tracks and the like. Ones of sensors 110 that can sense over the entire 100 meter to 5 kilometer range may be employed to sense forward of train 50 for all or part of that range.

Sensors 110 may include one or more of visible band imagers 112 producing either sequential still images or video images, one or more infrared (IR) band imagers 114 producing either sequential still IR images or video IR images, one or more radar imagers including Doppler radars and other types of radars, one or more laser ranging devices 118, and/or one or more acoustic ranging and/or sonar ranging devices 122.

Data sensed by sensors 110 is communicated to positive train control unit processor 120 over cables, e.g., electrical cables and/or optical fiber cables, which processes the sensor data to determine the track conditions ahead, and to then determine whether any dangerous or hazardous condition exists, and based thereon to initiate appropriate actions to signal the train crew The distance over which the various sensors 110 preferably sense can range from relatively close range, e.g., 10-50 meters to one, two or five kilometers, thereby to encompass sensing over a length of track that exceeds at least the breaking distance of the train over the range of expected forward speeds at which it operates, as well as a guard band to account for processing time and possible inaccuracy, uncertainty, and the like. The respective sensor fields of view preferably extend over a range of elevations (vertical angles) and a range of widths or azimuth (horizontal angles) sufficient to sense the track ahead of the sensor including the variations in grade and/or curvature known to be permitted for the track. In some cases, one sensor can sense over the entire ranges of distance, elevation and azimuth, and in other cases, more than one sensor may be required to sense over the entire ranges of distance, elevation and azimuth, e.g., to take into account the sensing ranges of the various sensors as well as the effects of the environment (e.g., light, rain, fog, snow, darkness) on those ranges.

The geographic location, or geographic position, of positive train control unit 100 and of the part of the train to which it is mounted, e.g., usually the locomotive or engine or a control cab at the front of the train, is determined by locating system 130 at least to an accuracy which enables determination of the track of a track way or railway having plural tracks the train is on. The locating system 130 preferably includes one or more Global Positioning System (GPS) units 132 operable with signals from GPS satellites to accurately determine the geographic position of the GPS unit 132 on the Earth. Use of plural locating units 132 reduces the likelihood of having a loss of location data due to inoperability of an on-board GPS device. Preferably, but optionally, global position determining units for two or more different and independent global positioning systems, e.g., the US GPS system, the Russian GLONASS system, the European Galileo system, the Indian IRNSS system and/or the Chinese BDS system, may be employed so that geographic location data is available even when one GPS system is out of range or out of service.

In addition and also preferably, but optionally, one or more additional location determining units 134, e.g., a gyroscopic and/or inertial navigation device 134, that operate independently of the GPS units 132 may be provided, so as to operate even when the train is in a tunnel, underground or otherwise out of communication with GPS satellites. Use of plural different types of locating devices 132, 134 reduces the likelihood of having a loss of location data due to inoperability of an on-board locating device 132, 134 as well as an outage of signals from a locating system satellite and/or beacon.

Thus, even the failure of all location determining units 130 of one type would not completely deprive positive train control unit 100 of accurate geographic location data. Moreover, correlating or otherwise combining the location information provided by plural location determining units 130 can provide location information to greater accuracy and/or with greater reliability than could only one location determining unit or one type of location determining unit.

All data produced by sensors 110 is associated with the location of positive train control unit 100 provided by location determination 130 at the time the data was acquired, and is also time tagged, e.g., by processor 120, so that all sensor data is both geo-tagged and time tagged for facilitating its being cross referenced to other data, both similar data and dissimilar data, for storing and processing such data within positive train control unit 100, and by the positive train control unit 100 of another train to which it may be transmitted, and at a central location to which such data may be transmitted 160, 162.

It is noted that because the data acquired is geo-tagged so that the location of the sensor is precisely known relative to the track way and is time tagged for correlation with other time tagged data, a complete representation of the operation of the train may be determined at and/or for any given time, both one each train and on other trains in communication therewith, as well as at a central train control location (if any), thereby to positively determine the location (including the track), speed and direction of the train 50 and to positively control its operation, as well as to aid in planning and execution train operations.

External data inputs 300 for positive train control unit 100 may be provided via data input device 140 which may include any number of data input devices, e.g., a keyboard, a touch screen, a USB drive reader, a memory card reader, a CD or DVD reader, a magnetic stripe reader, an RFID reader, and the like, and sources. Data inputs may include, e.g., one or more of track maps and speed limits, data from sensors 312 associated with wayside monitors 310, data from sensors 322 associated with switch monitors 320, and/or data from sensors 332 associated with track monitors 330, all of which may be communicated wirelessly.

Wireless communication may be via 220 MHz communication devices as utilized for communication with and between railroad trains, and/or via WiFi networks, ad hoc networks, cellular communication, bluetooth, RFID devices, and similar relatively local communication devices, which because of their independence from each other and their ability to establish and maintain communication networks and structures, can provide inherently robust and reliable data communication links. Communication ranges may be in the 1-5 kilometer range for communication by and between nearby trains and with nearby wayside, switch and track monitors 310, 320, 330, and may be over much greater distances, using one or more types of communication links, e.g., for communication with a central train facility. Accordingly, data input device 140 typically includes one or more wireless communication devices 140 operating via one or more antennas 142, e.g., mounted to train 50, typically and preferably to locomotive 52 thereof.

In general, such monitoring devices in addition to communicating sensed data within a relatively local surrounding region, which includes any trains (and positive train control units) within communication range, preferably also communicate the sensed data to a central computer or monitor which can also communicate such data to the trains, e.g., to the positive train control unit 100 thereon, however, the local communication links are considered to be the primary communication between such monitors 310-330 and each positive train control unit 100.

Positive train control unit 100 also typically includes one or more communication devices 160 which serve principally to communicate data from positive train control unit 100 to a central computer (solid line arrow) and need not be relied upon to communicate data from a central or control computer to positive train control unit 100 (dashed arrow) which is considered a secondary or back up communication path. Plural communication devices 160 may be employed for improved reliability and redundancy, and each may operate via one or more antennas 142, 162, e.g., located on train 50, and preferably on locomotive 52 thereof.

Processor 120 processes the data received from sensors 110, locating system 130 and data input 300, 140 to determine the geographic location of the train (positive train control unit 100) on the track map and its speed and direction, to compare that location, speed and position to the applicable train order, speed limits and known track conditions, e.g., as reported by one or more monitors 310-330. Processor 120 overlays the determined data onto a track map to provide a geographic information system (GIS) map which is available to train crew and optionally may be communicated 160 to a central or control computer. If an out of limits condition is determined, then processor produces an indication thereof and determines an appropriate response, e.g., request a revised train order, indicate a collision is likely or not likely, reduce speed, apply brakes and/or apply brakes for an emergency stop.

Processor 120 also processes the data received from sensors 110 to analyze the images, ranging data and other data therefrom, e.g., by comparing such data to templates of known objects and obstacles, e.g., templates of people, animals, vehicles, trains, and the like, stored in its memory. Processor 120 determines therefrom along with speed, direction and ranging data whether a dangerous object is in the path of the train and if so, to provide an indication of such object and related indications, e.g., collision likely or not likely, reduce speed, apply brakes and/or apply brakes for an emergency stop.

Data and indications from processor 120 may be communicated to an operator alert device 210 which may include one or more display monitors, an audible warning device, a visual warning device, a tactile warning device, or a combination thereof. The train crew being thus advised and/or warned of a condition, and being advised of an action to be taken, can then respond by taking appropriate action, all of which is monitored by processor 120.

If the train crew or operator does not respond either properly or timely to the advice, alert and/or warning, processor 120 communicates the necessary action to be taken to the train control system 220 of the train which automatically takes the necessary action, e.g., to reduce speed, apply the brakes and/or apply the brakes for an emergency stop.

Because processor 120 and the train systems 200, e.g., including train control 220, are in direct communication, processor 120 receives train operating data from train control 220 that is processed to determine, e.g., train speed and direction (forward or reverse), brake and braking status, engine status, train integrity, train deadman device status, and the like, thereby to produce data from the train control that can be compared to data determined from sensors 110, locating system 130, and data inputs and monitors 300 for consistency and accuracy, the lack of which would provide an indication of a device or other malfunction or failure for which an alert or warning may need to be given and/or action may need to be taken.

It is noted that the processing and/or control functions performed by processor 120 may be performed by one or more processors 120, P and that one or more of those processors 120, P may be included in and/or associated with any one or more of sensors 112, 114, 116, 118 and/or 122, as indicated and illustrated by the letter "P" therein. In any given arrangement of a positive train control unit 100, any or all of sensors 112, 114, 116, 118 and/or 122 may include, and is some arrangements may preferably include, a processor P configured to efficiently process the data sensed by the sensors thereof. In such instance, sensors 112, 114, 116, 118 and/or 122 provide output data that includes data representing any detected objects and or conditions relating to the track way. That output data are then further processed by PTC processor 120, which serves as a central or common resource, to provide combined and/or integrated data representative of track way and other conditions for effecting any necessary operator alerts 210 and/or train control 220 actions. Overall control of positive train control unit 100, including on, off and other control of sensors 112, 114, 116, 118 and/or 122, is preferably under the control of PTC processor 120.

Similarly, wayside, switch and track monitors 310, 320, 330 may also include processors 120, P, as indicated and illustrated by the letter "P" therein, that process sensed data to provide output data to PTC processor 120 for combination and/or integration with other data relating to track way conditions. Data from wayside, switch and track monitors 310, 320, 330 preferably includes location data representing the respective location thereof, e.g., by predetermined location data stored in a memory of and/or by a GPS locator of wayside, switch and track monitors 310, 320, 330.

Further, the processing, combination and/or integration of data may be performed in any order that is convenient, e.g., for efficient use of processor 120 and any processors associated with any of sensors 112, 114, 116, 118, 122, 310, 320 and/or 330. Similarly, time-tagging and/or geo-tagging of sensor data may be performed by PTC processor 120 associating time and/or location data from GPS device 132 and/or inertial navigation device 134 with data from sensors 112, 114, 116, 118 and/or 122, or by such time and/or location data being provided to sensors 112, 114, 116, 118 and/or 122 and associated with the data produced thereby, or by any or all of sensors 112, 114, 116, 118 and/or 122 including a time and/or locating device. Where plural devices each include a time reference, it is preferred that the time references of all devices be synchronized to a time standard of known accuracy, e.g., to the time standard of GPS device 132.

FIG. 4 is a schematic flow diagram illustrating operation 400 of the example embodiment of the positive train control unit 100 of FIG. 3. Process 400 commences with an initialization 410 so that all elements of positive train control unit 100 are in predetermined known operating states, e.g., all of sensors 110 are turned on and to a predetermined sensing range and/or mode, and processor 120 is likewise initialized so that the controlling computer program thereof commences operation at a known state. Sensor data acquisition 420 preferably is performed in parallel, and preferably independently, for each of the plural sensors 110, identified in the flow chart 400 as sensor #1 through sensor N.

In some embodiments, the sensing and data outputting cycles of the plural sensors 110 may be made contemporaneous in time so as to obtain plural data sets from different sources at substantially the same time, thereby to have substantially if not exactly the same geo-tagged location and time stamp. In other embodiments the sensing and data outputting cycles of the plural sensors 110 may be offset in time from each other so as to reduce a peak demand for data processing by processor 120 in a particular embodiment, it being recognized that the differences in the timing of the data from the plural sensors would be on the order of only a few seconds so that slight differences in geo-tagged locations and time stamps do not represent a material difference is the sensed data and/or a difference cannot be correlated with the data from others of the plural sensors 110.

For each of sensors #1 to N the respective operating sequence 420-1 through 420-N is substantially similar, although there may be differences in the details due to the particular configurations and capabilities of the various plural sensors 110, as is known to one of ordinary skill in the art relating to such sensors 110. First, the sensor acquires data 422-1 to 422-N and preferably associates location data and time data at the time of each sensing with the sensed data, thereby to geo-tag and time tag the sensor data. Alternatively, associating location data and time data with the sensed data can be done after the time of each sensing provided that the intervening time period is known or is inconsequentially small so that the appropriate location data and time data for the time of sensing can be computed, thereby to appropriately geo-tag and time tag the sensor data.

Each of sensors #1 to N then analyzes 424-1 to 424-N the data it has sensed to identify certain features of that data, e.g., to identify the track or track way which will stand out because it changes little between successive sensings, e.g., the track remains generally in front of the train and so will be in the same place in the sensed data and will change little between successive sensings, while the surrounding environment will change to a greater extent as the train moves. Moreover, the faster the train moves, the more substantially the surrounding environment will change, thereby making it easier to distinguish the track from its environment which is consistent with the desired sensing because the risk, e.g., due to sight line shortening and braking distance increasing, increases with the speed of the train.

Alternatively, and optionally, processor 120 may adjust the rate at which plural sensors 110 operate to sense and analyze 420 data as a function of the speed of train 50, e.g., as a function of the planned speed profile as defined by a train routing order, or by the speed limits as defined by the track map and the present location data, or by the measured actual speed of the train, or by a combination thereof The operating rate of one or more of plural sensors 110 would be increased as the speed (as planned, defined and/or measured) increases and could be decreased as the speed decreases.

Once sensor #1 to N identifies 424 from its sensed data the track in its field of view, it then analyzes the data to detect 426-1 to 426-N whether there is an object that is on or near to the track, or optionally, over a sequence of sensed data to detect 426-1 to 426-N whether there is an object that is moving towards the track. Each sensor #1 to N then outputs its sensed and analyzed data 440 and returns to repeat 415 the its data acquisition and analysis operating sequence 420 to sense and analyze data sensed at the next location and time. Thus, each of plural sensors 110 senses and provides a sequence of data sets that are geo-tagged and time stamped for correlation to the location and path of travel of the train 50.

Each geo-tagged and time stamped data set, and data relating to any objects that were detected thereby, outputted by plural sensors 110 is combined and integrated 440 with each other and with track maps, speed limits, location data, and/or train routing orders, e.g., as were received 300 to define the predetermined expected location and timing of train 50 along its intended route. The combined, integrated data, if configured to be human readable, would for any given time be comparable to an annotated map of a track way with the train location, speed and direction thereon, or for a period of time would be comparable to a video map display having the train moving thereon, annotated with its speed and direction.

The combined integrated 440 data is combined 450 with train operating data received 452, e.g., from the control system 220 and/or monitor 230, of the train 50, which typically would include data relating to throttle setting and speed, and brake application, as sensed and determined by the systems 220, 230 of the train 50. The combined integrated 440 data is also combined 450 with anomaly data received 454 from external monitors, e.g., wayside monitors 310, switch monitors 320 and track monitors 330 and their respective sensors 312, 322, 332.

While the foregoing description of operating process 400 includes a number of different steps or stages that are described in an order, that order is not necessary or required to be followed. The various steps and stages 415-460 can and may be performed an any suitable order, e.g., an order that produces the end result of a combined and integrated data set generated from the various sensors and monitors 420, 310, 320, 330, 220, 230 which in the illustration occurs at the output of the correlating data, identifying and quantifying hazards step 460. For instance, the detecting of objects 426 may be performed by the processing of sensed data in any or all of sensors #1 to N or by processing sensed data from any or all of sensors #1 to N in processor 120. Similarly, external data and anomaly data from various sensors and monitors 310, 320, 330, 220, 230 may be combined and integrated in step 440, in step 450, in step 460, or equivalently in a single or different step, as indicated, e.g., by the parenthetical statement in step 450 and the dashed arrows in the path designated by encircled letters A.

The combined, integrated correlated data and any identified hazards 440-460 are then utilized in positive train control unit 100 on train 50 for the operation thereof, as well as optionally, but preferably, being transmitted and reported 462 to a central control and/or operations location. It is important to note that operation of the positive control system 100 is entirely performed by positive train control unit 100 on train 50 without the need for data from or communication with a central control or operation location, and so the variability and interruptability of communications is not a degrading factor to the present arrangement.

Short range communication with external wayside monitors 310, switch monitors 320 and track monitors 330 is the only communication external to positive train control unit 100 on train 50 that is utilized in the operation thereof, and even that is not necessary to the essential operation of positive train control unit 100 on train 50. Data from such monitors in effect allows maintaining a looking forward distance that in some locations may be greater than the direct forward looking line-of-sight range of sensors 110 of positive train control unit 100, e.g., because the effects of physical obstructions, e.g., trees and hills, can be effectively eliminated.

Thus, loss of communication with external monitors 310-330 if acted upon would only result in a proportional speed reduction for train 50, and only if needed to maintain the same degree of safety under positive train control as with such communication. With conventional ground-based positive train controls, a loss of communication can cause the shutting down of all or of a portion of the railroad, e.g., with all trains stopped for safety or proceeding at an extremely slow safe speed. It is noted that short range communication with nearby monitors 310-330 is likely to be more reliable than would long range communication with a central control or operation location, e.g., due to a shorter distance and the ability to locate and direct antenna relative to a track way 60.

The correlated 460 data and identified hazard data may be transmitted 462 and/or otherwise reported 462 to a central control or operating location for monitoring and management purposes.

The combined, integrated correlated data and any identified hazards 440-460 are then utilized in positive train control unit 100 on train 50. To that end the integrated correlated data 440-460 is tested 470, 480, e.g., compared 470, 480, to predetermined limits established to determine whether the integrated correlated data is within or is outside of those limits. In a first instance, the integrated correlated data is compared 470 with a first predetermined limit, typically a limit indicative of a relatively lower risk, to determine if a warning action 464 should be taken, and if yes 470-Y, then alerts and warnings are provided 472 to the train operator, e.g., train crew. Such warnings may be by one or more visual and/or audible signals at the train crew work stations, e.g., in the train control cab for the train engineer and assistant. If the data is within the predetermined first limit, the path 470-N returns operation 400 to repeat 415 the process 400.

In a second instance, the integrated correlated data is compared 480 with a second predetermined limit, typically a limit indicative of a relatively higher risk, to determine if a positive train control action 482 should be taken, and if yes 480-Y, then train controls for speed and/or braking are activated 482 to reduce the train throttle setting, apply the brakes, or both, including possibly an emergency application of the brakes where, e.g., an object is on the track, or a switch is in the wrong position or is not properly closed, or a switch position is not consistent with the train routing order, or the rails are damaged or distorted. In addition, alerts and warnings to the train operator and/or crew are provided 464 or continued 464. If the data is within the predetermined second limit, the path 480-N returns operation 400 to repeat 415 the process 400.

Process 400 typically operates rapidly, repeating every second or every few seconds, so that the operation and detection of possible hazards is essentially continuous, e.g., being relatively short in time as compared to the movement of train 50 and to the rate at which any change therein may be effected. In a typical embodiment, process 400 is performed in about one second and repeats about every second. Detection by various ones of the sensors 110, 312 can be, and preferably are, in about the same time frame, e.g., taking as little as about 15 frames or one second for an image sensor, depending upon the size and distinctness of the object to be detected—a vehicle will be easier to detect than would a person or an animal of modest size. If desired, the repetition rate of process 400, as well as of the detection processes thereof, may be varied with to train speed, e.g., the faster the train is moving the more rapid would be the repetition rate of the operating cycle of process 400 and the slower the train is moving the more the repetition rate of the operating cycle of process 400 could be slowed.

Figure 6A:
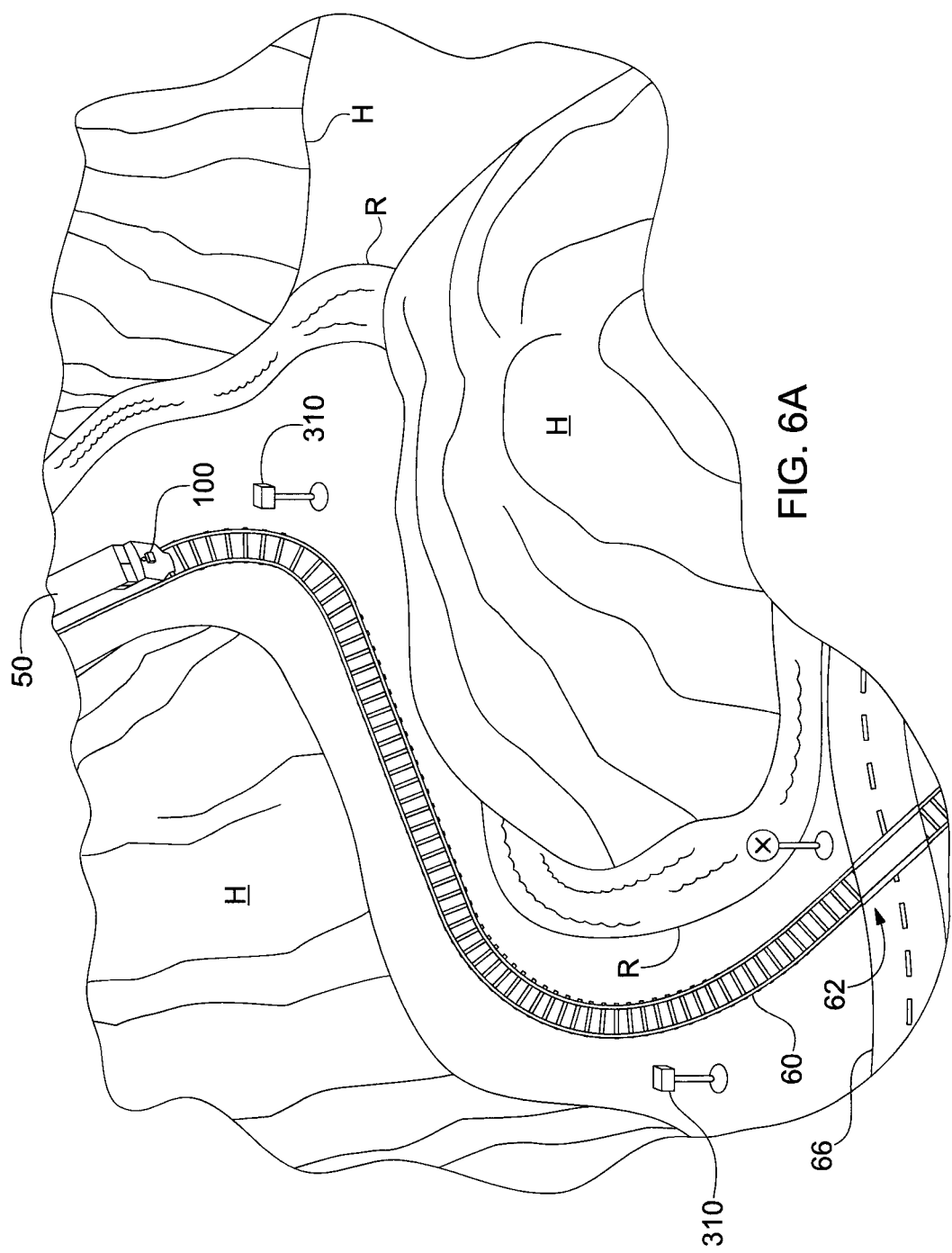
FIGS. 6A and 6B are a schematic diagram of an example embodiment of positive train control wayside monitors located along a track way and a schematic plan view thereof, respectively.
Figure 6B:
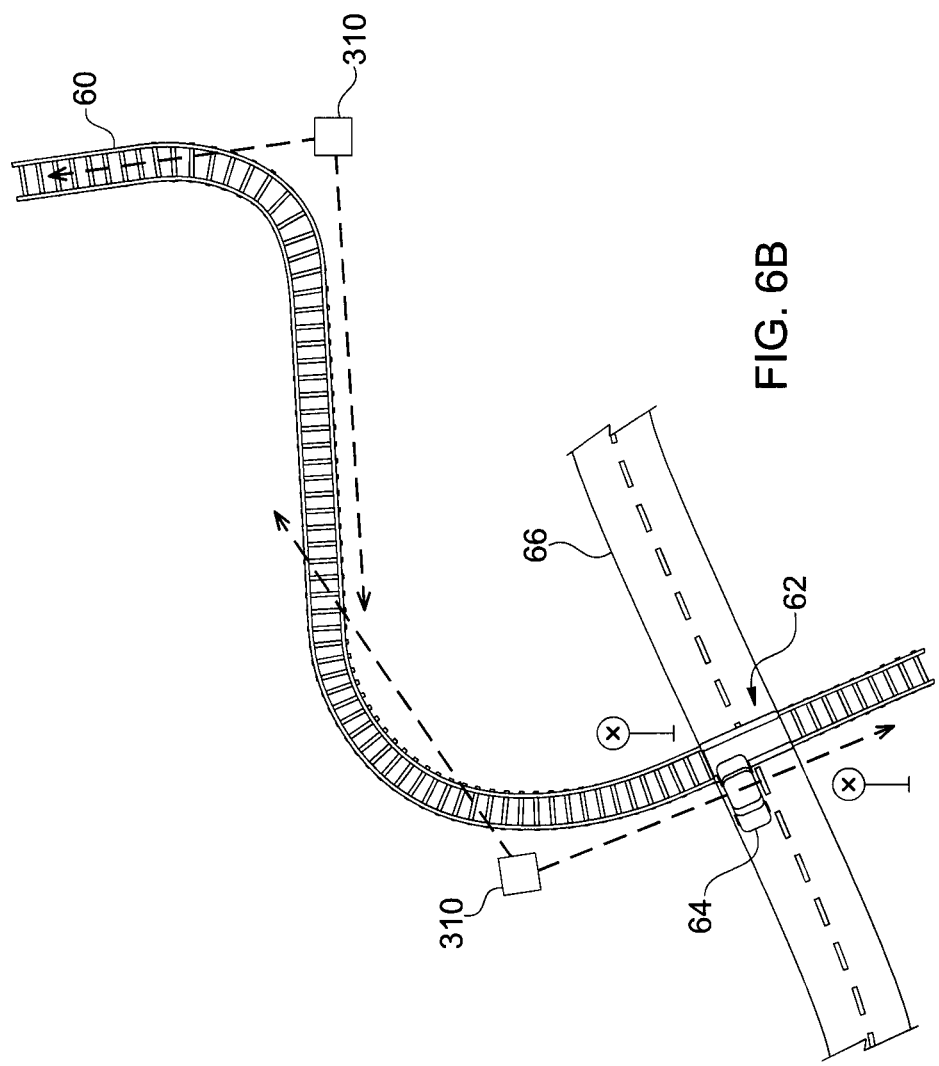
Figure 7:
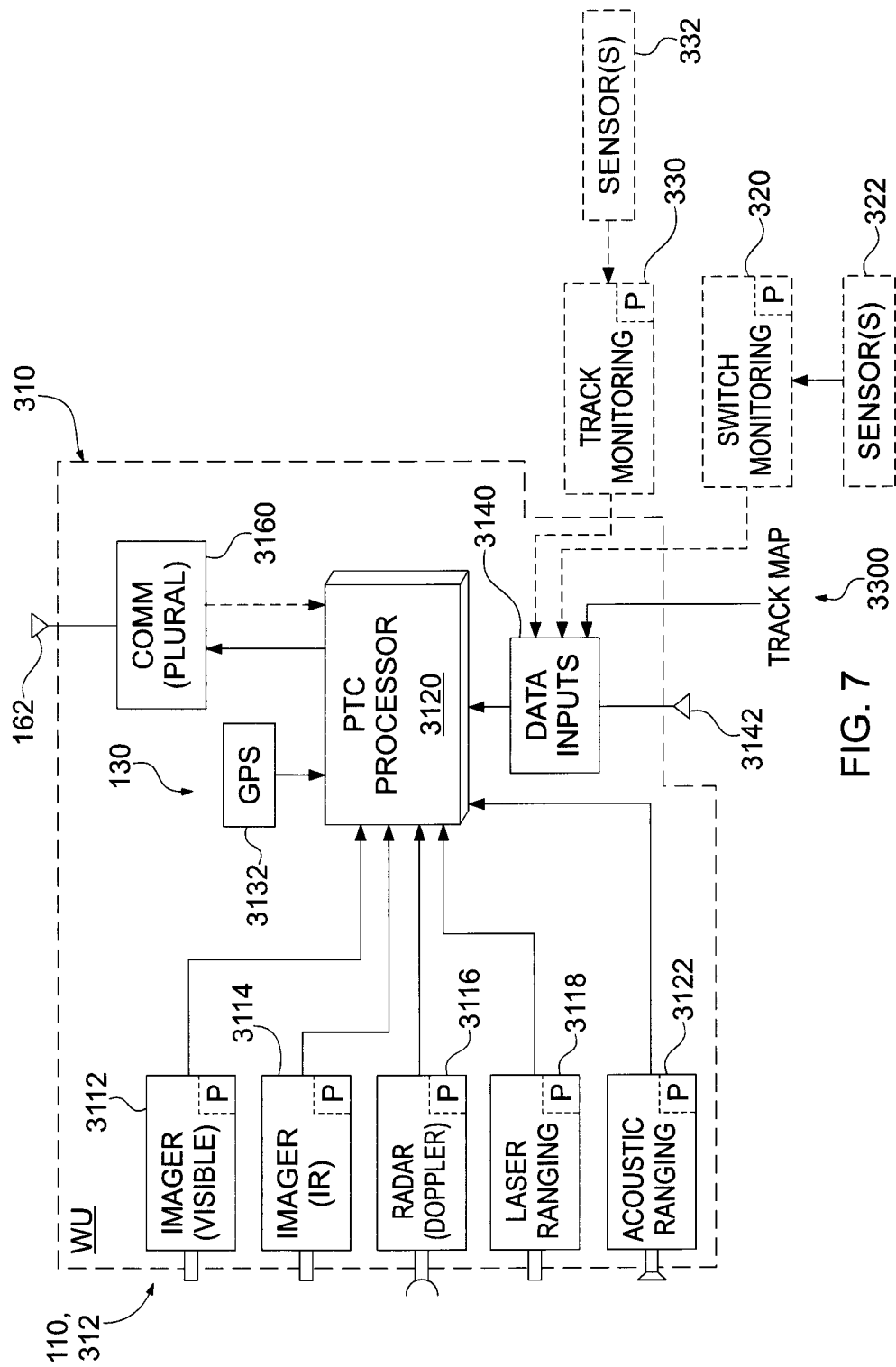
FIG. 7 is a schematic block diagram of an example embodiment of a positive train control wayside monitor unit suitable for mounting along a track way.

FIGS. 6A and 6B which are a schematic diagram of an example embodiment of positive train control wayside monitors 310 located along a track way 60 and a schematic plan view thereof, respectively; and FIG. 7 is a schematic block diagram of an example embodiment of a positive train control wayside monitor unit 310 suitable for mounting, e.g., along a track way 60. Wayside monitor unit 310 is similar to positive train control unit 100 in many respects and may be considered as a reduced complexity version thereof Consider that a train mounted positive train control unit 100 need take into account the ever changing geometry of the track ahead of the train as well as the operating condition and status of train engine and braking systems, none of which are of concern for a wayside monitor 310 that is mounted in a fixed location proximate a track way 60 which is itself in a fixed configuration.

The example track way 60 illustrated in FIG. 6 is in an example topography wherein the track way 60 has several curves and/or hills and/or is shielded by topographical features, e.g., hills, mountains and/or tunnels, so that the distance forward of train 10 that is within the fields of view of sensors 110 of positive train control unit 100 thereon is substantially reduced. Certain sensors 110 have straight line sensing and range views and cannot "see" or sense around obstacles. To reduce blind spots resulting therefrom, one or more wayside monitor units 310 may be provided along the track way 60 in locations wherein the fields of view of their sensors 110, 312, can be put to good and efficient use.

For example, on curves a wayside monitor 310 may be located radially outside of the curved track way 60 so as to have longer sensor 110, 312, ranges than could be obtained from locations on the track way 60, e.g., by a positive train control unit 100. On hills a wayside monitor 310 may be located, e.g., near the crest of a hill or near the low point of a valley to the same end. Both the distance from track way 60 and the height at which wayside monitor 310 is mounted may be selected to gain an improved sensor 110, 312 field of view and range. Wayside monitors 310 at such locations may include sensors 110, 312 that have respective fields of view in substantially different directions so as to provide coverage of the track way in both directions from the location of wayside monitors 310, as indicated by the dashed arrows in FIG. 6B.

In the illustrated example, one or more wayside monitors 310 is located near each of the oppositely curved portions of track way 60 that define an "S" shaped curve of track way 60 so as to provide substantially complete sensor 110, 312 coverage thereof over a desired sensor range, e.g., of 100 meters to 2000 or 5000 meters, in one or more directions, particularly where train mounted positive train control unit 100 cannot provide a complete picture.

In the illustrated example, a wayside monitor 310 is located proximate a crossing, e.g., a grade crossing 62 or a track way crossing, within the sensing range and fields of view of its sensors 312 for monitoring crossing 62, principally for detecting any object or obstruction, e.g., a crossing vehicle 64 or train 50, that may be on or crossing track 60. Such locating of wayside monitor 310 is most commonly and importantly at locations at which the crossing 62 is not visible to an approaching train 50, 52, e.g., due to track way curvature and/or obstructions to the field of view of personnel and sensors 110 associated with train 50, 52, and may also be beneficially employed at other locations to reduce the danger arising due to reduced visibility due to darkness, rain, fog and the like.

For example, a vehicle 64 may be operating on roadway 66 which crosses track way 60 at grade crossing 62 which may or may not have electrical crossing signals and/or gates. One or more sensors 110, 312 of wayside monitor 310 detect vehicle 64 and relay data representative of an object being on the track way 60 during the period of time that vehicle 64 is, e.g., within the right of way of track way 60. The data representing presence of vehicle 64 is relayed and/or transmitted by communication device 3160, e.g., to positive train control units 100 that are proximate wayside monitor 310, e.g., approaching crossing 62, and optionally, but preferably, to a central monitoring facility.

Example wayside monitor 310 sensors 110, 312 may include one or more of visible band imagers 3112 producing either sequential still images or video images, one or more infrared (IR) band imagers 3114 producing either sequential still IR images or video IR images, one or more radar imagers 3116 including Doppler radars and other types of radars 116, 3116, one or more laser ranging devices 3118 and/or one or more acoustic ranging and/or sonar ranging devices 3122. Sensors 3112. 3114. 3116, 3118 and/or 3122 preferably, but need not, correspond to like sensors 112, 114, 116, 118 and 122 of positive train control unit 100.

Data sensed by sensors 110, 312 is communicated to processor 3120 (which corresponds to processor 120 of positive train control unit 100) over cables, e.g., electrical cables and/or optical fiber cables, which processes the sensor data to determine the track conditions within its fields of view, and to then determine whether any dangerous or hazardous condition exists, and based thereon to transmit data that may be combined with positive train control unit 100 sensor 110 data on a train 50 by processor 120 thereof to, e.g., initiate appropriate actions to signal the train crew and/or exercise control over train 50.

The distance over which the various sensors 110, 312 preferably sense can range from relatively close range, e.g., 10-50 meters ahead up to one, two or five kilometers ahead, thereby to encompass sensing over a length of track that is within the viewing range and field of view of that wayside monitor 310. The respective sensor fields of view preferably extend over a range of elevations (vertical angles) and a range of widths or azimuth (horizontal angles) sufficient to sense the track within their fields of view including the variations in grade and/or curvature known to be permitted for sensing by such sensors 312. In some cases, one sensor 312 can sense over the entire ranges of distance, elevation and azimuth, and in other cases, more than one sensor 312 may be required to sense over the entire ranges of distance, elevation and azimuth.

The geographic location of wayside monitor 310 may be obtained by one or more GPS sensors 3132 thereof or may be provided as one of the data inputs 3140, 3142 received from an external source, e.g., manual data input, as may be desirable. In any event, such data is available for use by processor 120, 3120 as above.

All data produced by sensors 110, 312 is associated with the location of wayside monitor 310 provided by location determination 130, 3132 at the time the data was acquired, and is also time tagged, e.g., by processor 3120 so that all sensor data is both geo-tagged and time tagged for facilitating its being cross referenced to other data, both similar data and dissimilar data, for storing and processing such data within wayside monitor 310, and by any positive train control unit 100 to which it may be transmitted, and at a central location to which such data may be transmitted 160, 162.

Optionally, switch monitors 320 and/or track monitors 330, if any (shown dashed), that may be located nearby to wayside unit 310, e.g., within communication range, may communicate their data to and via data inputs 3140, 3142 and/or via communication device 3160 of wayside unit 310 for combination with data produced by wayside unit 310 and/or for transmission by wayside unit 310, e.g., to a train 50 and/or to a central facility.

All elements of wayside unit 310 may be and preferably are similar to corresponding elements of positive train control unit 100 as described herein, and may function, and preferably do function in similar manner thereto. Similar elements of wayside unit 310 may bear the same item number as their counterparts in positive train control unit 100 preceded by the numeral 3, e.g., processor 3120 is similar to processor 120, and may include one or more processors 3120, P as described above in relation to processor 120.

Figure 8:
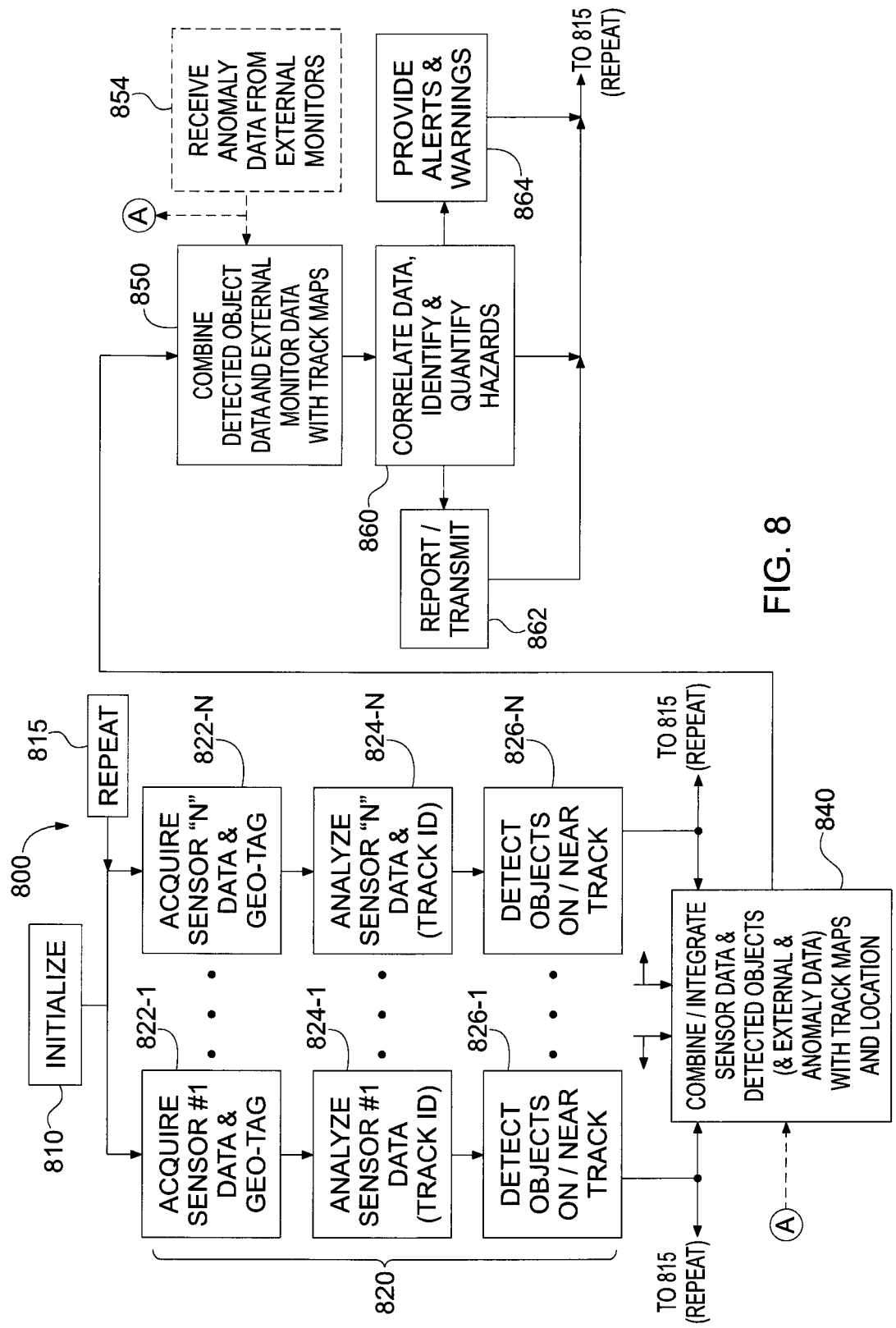
FIG. 8 is a schematic flow diagram illustrating operation of the example embodiment of FIG. 7.

FIG. 8 is a schematic flow diagram illustrating operation 800 of the example embodiment of the positive train control wayside unit 310 of FIG. 7. Operation 800 is in many aspects substantially similar to process 400 and the variations thereof described above in relation to positive train control unit 100. In particular, the operation 800 of items 810 through 860 are substantially similar to that of items 410-460 of operation process 400, with the initial digit of equivalent steps being an "8" rather than a "4."

Sensed and/or processed data produced by operation 820 of plural sensors 312 of wayside unit 310 which is fixed at a predetermined location may be and typically are less complex than that for process 400, because the field of view and range of the plural sensors 312 of a wayside unit 310 are fixed and can be predetermined because the location and orientation of wayside unit 310 and its plural sensors 312 are known and are fixed. For example, once the track 60 is identified 824, it can at least be preset if not fixed for the analysis of sensor data and so object detection 826 may require the most processing effort.

Moreover, because the location of wayside monitor 310 is known and fixed, the track map may be defined for the relatively short length of track that is in the field of view and range of sensors 312, or may simply be location data, e.g., location data for a grade crossing 62 being monitored.

The combined integrated 840 data and detected object data is combined 850 with anomaly data received 854 from external monitors, e.g., other wayside monitors 310, or nearby switch monitors 320 and track monitors 330 and their respective sensors 312, 322, 332. Item 854 is shown as dashed because there may or may not be any external monitors 310, 320, 330 associated with the wayside monitor 310 performing process 800.

While the foregoing description of operating process 800 includes a number of different steps or stages that are described in an order, that order is not necessary or required to be followed. The various steps and stages 815-860 can and may be performed an any suitable order, e.g., an order that produces the end result of a combined and integrated data set generated from the various sensors and monitors 820, 310, 320, 330 which in the illustration occurs at the output of the correlating data, identifying and quantifying hazards step 860. For instance, the detecting of objects 826 may be performed by the processing of sensed data in any or all of sensors #1 to N or by processing sensed data from any or all of sensors #1 to N in processor 3120. Similarly, external data and anomaly data from various sensors and monitors 310, 320, 330, may be combined and integrated in step 840, in step 850, in step 860, or equivalently in a single or different step, as indicated, e.g., by the parenthetical statement in step 850 and the dashed arrows in the path designated by encircled letters A.

Most importantly, the combined, integrated correlated data and any identified hazards 840-860 are transmitted using local communication links for a distance from wayside unit 310 sufficient to provide 864 hazard data alerts and warnings to an approaching positive train control unit 100 indicating whether there is a hazard, e.g., an object on the track or a switch or track anomaly. In addition, and optionally, but preferably, the combined, integrated correlated data and any identified hazards 840-860 may also be transmitted and reported 862, e.g., to a central control and/or operations location.

Figure 9A:
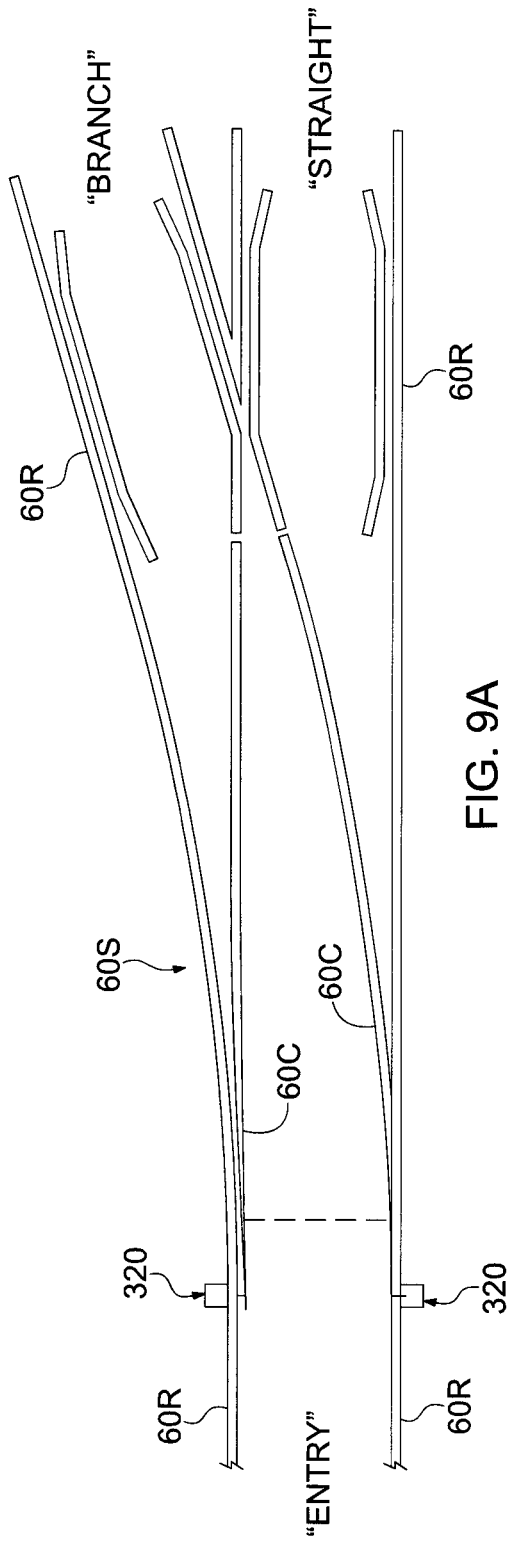
FIGS. 9A and 9B are schematic plan views of a an example of a switch having an example embodiment of a switch monitor therewith and an enlarged view thereof, respectively.
Figure 9B:
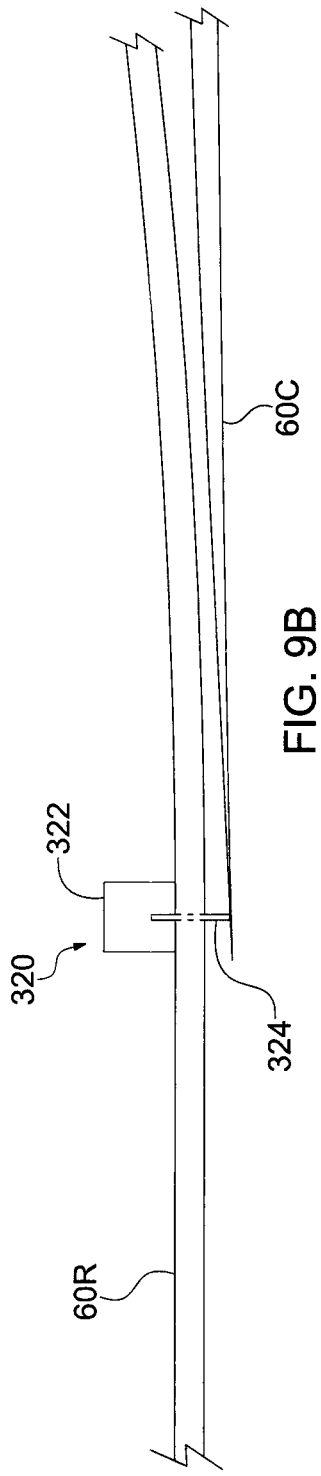

FIGS. 9A and 9B which are schematic plan views of a an example of a switch 60S having an example embodiment of a switch monitor 320 therewith and an enlarged view thereof, respectively. Example switch monitor 320 senses the position of the switch rail and provides a separate independent positive indication that the switch has completely transferred to supplement the conventional switch interlock signaling and optionally, but preferably, be in communication with the electrical interlock signaling electronics to improve the integrity of the indications it provides. Any condition where the physical spacing and/or alignment and/or completeness of a transfer of a switch rail of a track way is not within prescribed configuration and/or tolerances is referred to herein as an anomaly of the track way.

Switch 60S has a pair of "entry" stock rails 60R that branch to one or the other of stock rails 60R of a "straight" track and a "branch track." A typical switch 60S includes various rails, e.g., closure rails, wing rails, check rails, a knuckle, as is known for a conventional railroad switch. Within switch 60S, one closure rail 60C cooperates with an opposing stock rail 60R and the other closure rail 60C cooperates with another opposing stock rail 60R to provide respective pairs of spaced apart rails upon which a train rides over switch 60S. The pair of switch closure rails 60C are movable so that the respective movable ends thereof become very close to one or the other of the "entry" stock rails 60R to effect the switching action while the opposite ends thereof are pivotable about a pivot adjacent to the ends of the closure rails nearest to the "entry" end of switch 60S.

One or more switch monitor sensors 322 are mounted to one or both stock rails proximate the location whereat the movable ends of switch rails 60C become closely adjacent, and preferably abut the stock rails 60R. Sensor 322 includes a movable mechanical member 324, e.g., a connecting rod or bar 324, that at one end is attached to the movable end of switch rail 60C and at the other end is movable within a housing including sensor 322 to represent the movement and position of switch rail 60C. Sensor 322 is preferably housed within a weather tight housing or enclosure to protect it from the elements, and may include a heat source, e.g., an electrical heater where local power is available, so that ice and snow do not adversely affect its operation. Movable member 324 may be slidably enclosed in a telescoping shield and/or otherwise shielded from the elements, particularly ice and snow.

Within sensor 322 is a sensing arrangement for sensing the physical position of member 324 and thereby the position of switch rails 60C relative to the stock rails to which they are intended to become closely adjacent or abut. Examples of such sensing arrangements are described below. Member 324 may be attached to switch rail 60C by a pivotable joint so that the other end thereof moves in a desired geometric pattern relative to the sensor 322 sensing arrangement.

Because of the small dimension of the physical distances in the position of switch rail 60C relative to stock rail 60R that may be detected by switch sensor 320, 322, the physical switch data it senses and detects may be utilized to evaluate the operational tolerances and integrity of the switch 60S to thereby enable investigation, maintenance and/or repair before the gap between physical switch rail 60C and stock rail 60R at switch closure becomes beyond specifications and a risk to safety.

As noted herein, switch monitor 320 includes one or more communication transmitters that communicate switch data to positive train control units 100 attached to trains, to wayside monitors 310, and/or to a central monitoring location, thereby to make the sensed data available to a train 50 for evaluating the need for a safety action to be taken.

Figure 10:
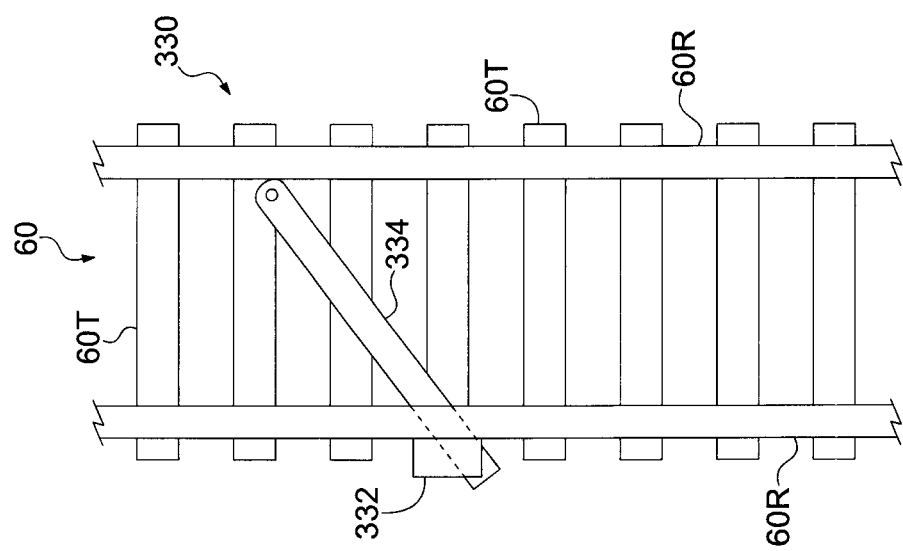
FIG. 10 is a schematic plan view of an example of a track way having an example embodiment of a track monitor therewith.

FIG. 10 is a schematic plan view of an example of a track way 60 having an example embodiment of a track monitor 330 therewith. Example track monitor 330 senses and provides a separate independent positive indication that the physical spacing and alignment of rails 60R are within prescribed tolerances. Any condition where the physical spacing and/or alignment of a track way and/or of the rails of a track way is not within a prescribed configuration and/or tolerances is referred to herein as an anomaly of the track way.

One or more track monitors 330 are mounted to one or both rails 60R at spaced apart locations along track 60 whereat the likelihood of rails 60R becoming distorted or mis-aligned is higher than normal. Example track monitor sensor 332 includes a movable mechanical member 334, e.g., a connecting rod or bar 334, that at one end is attached to one rail 60R, preferably at the inside thereof, and at the other end is movable within a housing including sensor 332 to represent the relative movement and position of one rail 60R in relation to the other parallel rail 60R.

Sensor 332 is preferably mounted a distance longitudinally along track 60 from the end of connecting member 334 that is attached to the one rail 60R such that there is a substantial angle between connecting bar 334 and cross ties 60T. Preferably, that distance is selected to provide an angle of between about 30° and about 60°, and preferably about 45°, between rails 60R and connecting member 334, and between cross-ties 60T and connecting member 334; thus member 334 typically spans about 2-3 cross ties 60T. With track monitor 330 monitoring points on rails 60R that are separated transversely by the track gage width and longitudinally by a length of track 60 of similar dimension, distortion and misalignment of rails 60R in both longitudinal and transverse directions can be monitored, thereby to provide greater sensitivity to relative movement of the two rails 60R than might otherwise be provided.

Sensor 332 is preferably housed within a weather tight housing or enclosure to protect it from the elements, and may include a heat source, e.g., an electrical heater where local power is available, so that ice and snow do not adversely affect its operation. Movable member 334 may be slidably enclosed in a telescoping shield and/or otherwise shielded from the elements, particularly ice and snow.

Within sensor 332 is a sensing arrangement for sensing the physical position of member 334 and thereby the relative positions of parallel rails 60R relative to each other to which they are intended to be and remain parallel. Examples of such sensing arrangements are described below. Member 334 may be attached to rail 60R by a pivotable joint so that the other end thereof moves in a desired geometric pattern relative to the sensor 332 sensing arrangement.

Because of the small dimension of the physical distances in the relative positions of rails 60R that may be detected by track sensor 330, 332, the physical track data it senses and detects may be utilized to evaluate the operational tolerances and integrity of the track 60 to thereby enable investigation, maintenance and/or repair before the distortion and/or misalignment thereof becomes beyond specifications and a risk to safety.

As noted herein, track monitor 330 includes one or more communication transmitters that communicate switch data to positive train control units 100 attached to trains, to wayside monitors 310, and/or to a central monitoring location, thereby to make the sensed data available to a train 50 for evaluating the need for a safety action to be taken FIGS. 11A-11B and 12A-12C illustrate various example embodiments of different sensors 322, 332 that may be utilized with, e.g., switch monitors 320 and track monitors 330, as well as with other monitors, even though the description herein will usually only refer to one of the different monitors.

Figure 11A:
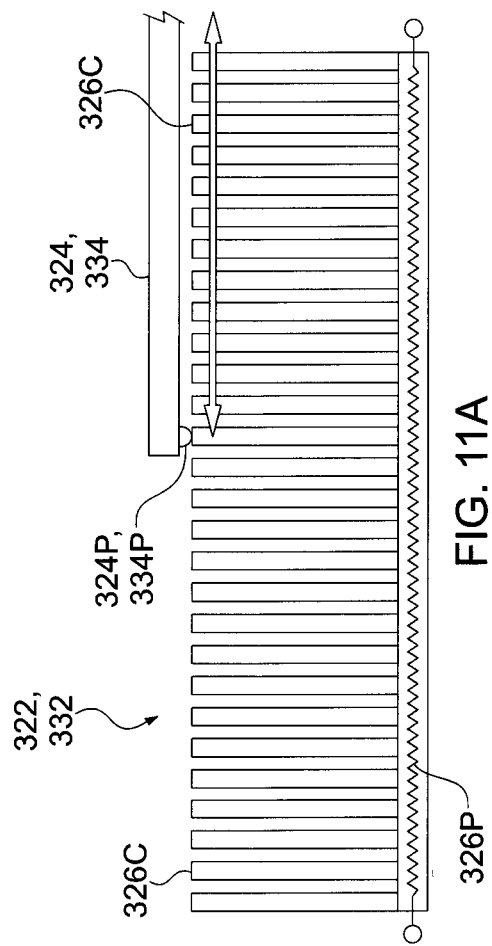
FIGS. 11A and 11B are schematic plan views of examples of respective contact based monitor sensors.
Figure 11B:
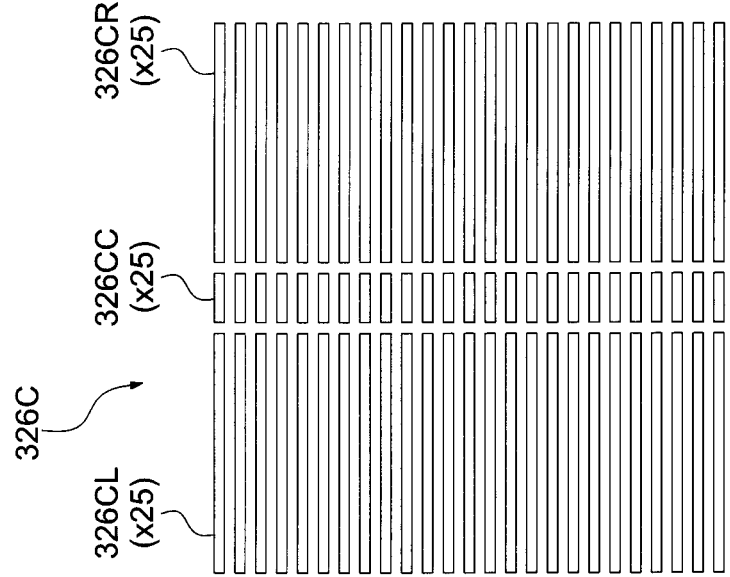

FIGS. 11A and 11B are schematic plan views of examples of respective electrical contact based monitor sensors 322, 332. The example sensor 322 of FIG. 11A has a long resistive element 326R that may be a strip of resistive material or a series connection of a plurality of discrete resistors, as may be desirable or convenient. Extending substantially perpendicularly from resistive element 326R and electrically connected thereto are a plurality of spaced apart electrically conductive strips 326C that are substantially parallel to each other.

A probe 324P, 334P attached to member 324 moves in a direction generally parallel to resistive element 326R as member 324 moves, e.g., in response to movement of a switch rail 60C or the relative movement of two parallel rails 60R. Thus movement of member 324 moves probe 324P across the conductive elements 326C in a direction generally parallel to the resistive element 326R, as indicated by the double-ended arrow. Given that the distribution of resistance along the length of resistive element 326R is known, then the resistance between probe 324P and either end of resistive element 326R is representative of the position of probe 324P relative to resistive element 326R, and so measuring that resistance provides an indication of which of conductive elements 326C probe 324P is in electrical contact with and therefor the physical position of probe 324P and member 324.

That resistance may be measured either directly, e.g., by an ohmmeter or its equivalent, or indirectly, e.g., by applying a voltage across or a current through resistive element 326R and measuring the voltage at probe 324P, or by applying a voltage between or a current through probe 324P and one end of resistive element 326R and measuring the voltage at the other end of resistive element 326R, wherein such measurements may be made by an analog to digital converter or other known device. Any suitable measuring device and/or technique with a resolution and accuracy that can reliably and repeatably distinguish the differences between the resistances to adjacent conductive elements 326C may be utilized.

Regarding FIG. 11B, a pattern of elements 327C includes a linear pattern of a given number, e.g., 25, of relatively shorter adjacent central elements 327CC with corresponding aligned linear patterns of the given number of relatively longer adjacent elements 327CL and 327CR on opposite sides thereof. The array of this example is an M×N array of elements 327C, where M=3 and N=25. Overall, this example array 327C may be about 114 by 98 mm (about 4.49 by 3.86 inches), and each element 327CC is about 2 by 10 mm (about 0.08 by 0.4 inch) and each element 327CL, 327CR is about 2 by 50 mm (about 0.08 by 1.97 inch). Spaces between adjacent elements is about 2 mm (about 0.08 inch).

As above, the elements 327C of this embodiment may be electrically conductive or non-conductive as for use with different kinds of sensor probes. For an electrically connective probe 324P, elements 327C may be formed, e.g., on one side of an electrical printed circuit board, with resistive elements and connections on the opposite side thereof The pitch or spacing of elements 326C, 327C essentially determines the resolution of sensor 322, 332, and may be, e.g., in the range of about 1 to 10 mm (about 0.04 to 0.4 inch). If the pitch of elements 326C, 327C is about 1 mm (about 0.04 inch), then that is the resolution of sensor 322, 332. When elements 326C, 327C are electrically conductive elements 326C, 327C, the width and spacing of conductive elements 324C are typically about the same and the contact area of probe 324P is preferably at least slightly larger than the spacing between conductive elements 326C, 327C so that there are no positions at which there is no connection between probe 324P and at least one conductive element 326C, 327C. One example of probe 324P has a probe dimension of about 0.9 times the pitch or spacing.

Probe 324P may include a fixed contact, e.g., a hemispherical slidable contact, or a movable contact, e.g., a ball or roller bearing, that can "roll" over conductive elements 326C, 327C or any other suitable form of slidable or otherwise movable electrical contact for making electrical connection with the element 326C, 327C that it physically touches.

Alternatively, probe 324P need not make electrical contact with elements 326C, 327C in which instance elements 326C, 327C need not be electrically conductive. For example, elements 326C, 327C may merely be a pattern, texture or other surface feature and probe 324P may be a conventional computer mouse or its equivalent wherein rotation of a ball indicates physical position and movement, or elements 326C, 327C may be optically distinguishable markings, e.g., a pattern of stripes or lines or texturing, and probe 324P may be a conventional optical computer mouse or its equivalent that detects such markings with high precision to determine physical position and movement.

While the electrically contacting embodiment of probe 324P and elements 326C allows the physical position of member 324 to be determined in one dimension, the M×N array configuration of elements 327C or the computer mouse embodiments or equivalent embodiments of probe 324P allow the physical position of member 324 to be determined in two dimensions, which is considered particularly useful for use with the track monitor 330 wherein track distortion may be in two dimensions.

Figure 12A:
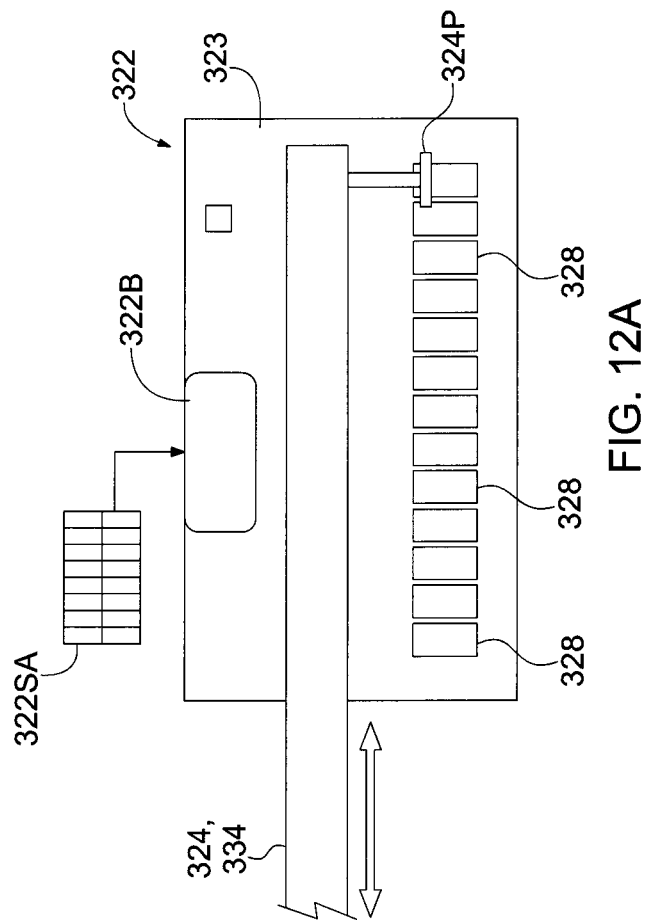
FIGS. 12A, 12B and 12C are a schematic plan view of an example of an optical sensing based monitor sensor, a schematic block diagram of such optical based monitor sensor, and a schematic circuit diagram of an optical sensor usable therewith, respectively.
Figure 12B:
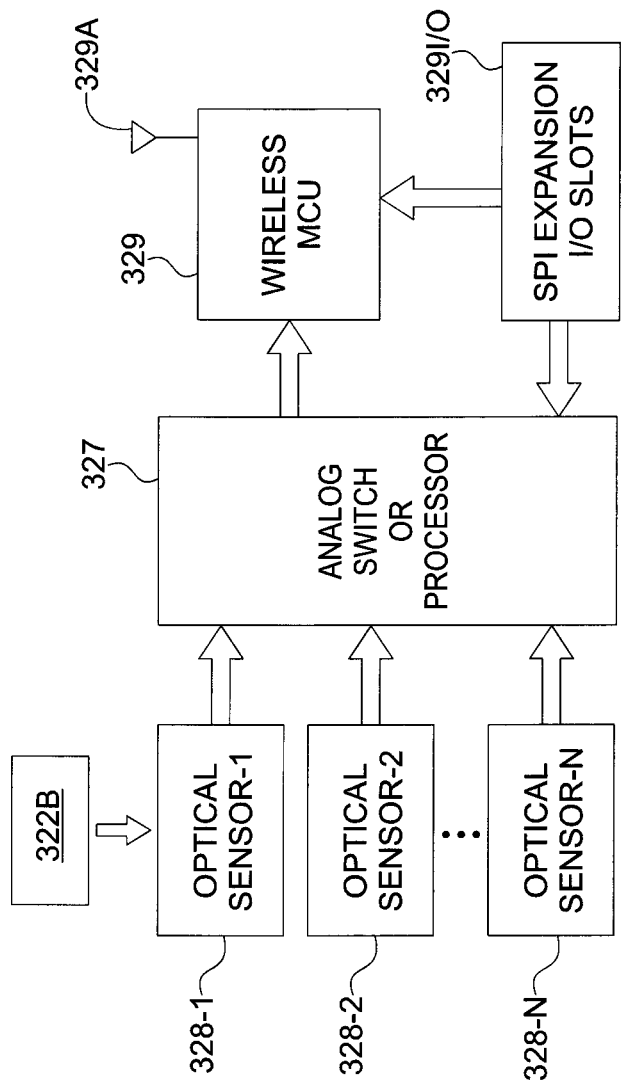
Figure 12C:
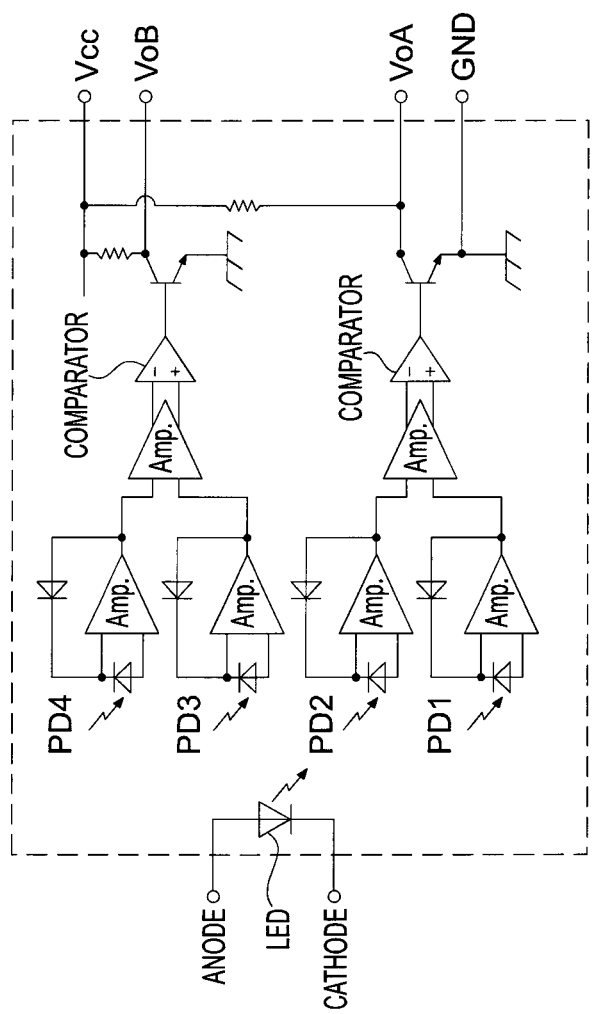

FIGS. 12A, 12B and 12C which are a schematic plan view of an example embodiment of an optical sensing based monitor sensor 322, 332, a schematic block diagram of such optical based monitor sensor 322, 332, and a schematic circuit diagram of an optical sensor 322, 332 usable therewith, respectively.

Sensor 322, 332 may be provided on an electrical printed circuit board 323 which includes the electronic and mechanical components thereof An array of optical sensing elements 328 may be provided for detecting the physical position of member 324, 334, e.g., as it moves with a switch rail 60C or parallel rails 60R. Typically, optical sensors 328 would be closely adjacent each other so as to provide closer resolution and probe 324P may be elongated so as to probe plural ones of optical sensors 328 and/or to have an array or pattern of reflective and/or transmissive sensing locations thereon. Seven optical sensors 328 are presently thought to provide suitable resolution, e.g., about 0.5 mm (about 0.02 inch) or less, for a switch monitor 320, however, a greater or lesser number may be utilized.

Optical sensors 328 include one or more light emitting diodes (LEDs) and a plurality of optical detectors, e.g., photo-diodes PD1-PD4, that are positioned to respond to the light emitted by the one or more LEDs, e.g., as reflected or transmitted by a sensing probe adjacent thereto. Therein, the outputs from photo-diodes PD1-PD4 are amplified by respective amplifiers "Amp." and detected by respective comparators to produce output signals VoA and VoB. Sensors 328 are powered by voltage Vcc, e.g., 2.7-5.5 VDC, and the LED thereof is powered by a current applied from its anode to its cathode.

Optical sensors 328 may be of a reflective type wherein an external element, e.g., probe 324P, has a patterned reflective surface that is movable and adjacent to sensors 328 so as to selectively reflect light emitted by the LED towards photo-diodes PD1-PD4 from which sensor 328 determines the physical position of member 324, 334 to which probe 324P is attached. Optical sensors 328 may be of an interruptive type wherein an external element, e.g., probe 324P, has a patterned array of one or more openings that is movable in a gap space of sensors 328 so as to selectively block and pass light emitted by the LED towards photo-diodes PD1-PD4 from which sensor 328 determines the physical position of member 324, 334 to which probe 324P is attached. The patterning of the reflective surface and/or the array of openings in probe 324P may be arranged to encode positions on a closer (finer) resolution than is the spacing or pitch of the optical sensors 328.

The respective outputs VoA, VoB of plural optical sensors 328-1 through 328-N are combined, e.g., scanned and/or multiplexed and/or processed, either by an analog processor or a digital or a digital processor, e.g., by an analog switch 327, e.g., a 14 times multiplexer, or by a microprocessor 327, and are provided to wireless micro-controller unit (MCU) 329 which modulates and transmits the sensed data representing the physical position of member 324, 334 to nearby positive train control units 100 and/or to nearby wayside units 310 and/or to more remote locations, e.g., a central control location, via one or more communication links, e.g., of the types described herein. The capacity of analog switch 327 and MCU 329 may be increased by additional data channels provided by an serial peripheral interface (SPI) expansion device 329I/O that provides additional input and/or output (I/O) slots.

Sensor 322, 332 is powered by power source 332B which may include an external power source, a battery and/or a solar cell power supply 322SA. An example 3.6 VDC Lithium battery, e.g., of 2000 mA-Hr or higher capacity, is suitable to provide a desirable 3.3 VDC operating voltage.

In a typical embodiment, at least a combination of plural sensors selected from among the suitable visible and infrared imaging systems, laser ranging systems, acoustic ranging systems, and/or Doppler radar and ranging systems, are employed for detecting the presence of objects within the field of view and range of the sensors, which preferably includes ranges of about 100 meters up to 5000 meters (5 Km), to allow for adequate time for detection, processing and for initiating warnings, braking stopping, emergency stopping, and other appropriate corrections and actions.

An example of a suitable visible imager or sensor 112 includes, e.g., a NORIRHJK-2C CCD and thermal surveillance system, which is available from North Night Vision Science & Technology Group Corp, located in Yunnan, China.

An example of a suitable infrared imager or sensor 114 includes, e.g., model JIR-3031 and JIR-3031A digital cameras available from JIR company located in Hubei, China, and through Alibaba.com. These digital IR cameras have an about 37°×28° field of view, can sense through fog and precipitation and without visible illumination, and operate from a 12-24 VDC power supply (as may be available in a vehicle).

Another example includes the types IP-ELR320, IP-ELR775 and IP-ELR775X night vision IR camera system which can detect a car-size object at respective ranges of 2500 meters (day) and 1500 meters (night), 5000 meters (day and 2500 meters (night, and 8000 meters (day) and 2500 meters (night), can detect human-size objects at respective ranges of 1500 meters (day) and 900 meters (night), 2000 meters (day) and 1200 meters (night), and 4000 meters (day) and 1500 meters (night), and can employ an 808 nm IR illuminator, and are available from Kintronics, Inc., located in Ossining, N.Y.

Further examples include the Sigma Series PTZ laser diode IR illuminating and imaging equipment available from Ascendent Technology Group of Cranbrook, British Columbia, Canada, and the Lynceus™ ISN and ISA series of vision and IR laser illuminated night vision camera systems available from Kaya Optics, Inc. located in Tokyo, Japan.

Examples of a suitable Doppler radar sensor 116 include, e.g., types KR-1338C and KR-1668C marine radars available from Bochi of Changqing, China, and model S66 radar available through Alibaba.com.

An example of a suitable laser ranging sensor 118 includes, e.g., AIGERZYT-LLS-81-X, which is available from Beijing Zhong Yuan Tong Science & Technology Co., Ltd. located in Beijing, China.

An example of a suitable acoustic ranging sensor 122 includes, e.g., the Acoustic Ranger 5000, which is available from Phoenix Inspection Systems, Ltd. located in Warrington, United Kingdom.

The data sensors, processing and communication of various control and monitor units herein may employ similar components and configurations to, e.g., those of the ZONER™ RFID devices and/or the RELAYER™ RFID readers and communication relays, and similar devices, as described in U.S. patent application Ser. No. 11/198,711 filed Aug. 5, 2005 and entitled "Object Monitoring, Locating and Tracking Device Employing Active RFID Devices" which issued as U.S. Pat. No. 7, 319,397, and may be operated similarly to the devices described in U.S. patent application Ser. No. 11/749,996 filed May 5, 2007 and entitled "System and Method for Operating a Synchronized Wireless Network" which issued as U.S. Pat. No. 8,174,383, each of which is hereby incorporated herein by reference in its entirety for any and all purposes.

A positive train control unit 100 mountable on a train 50 movable on a track way 60 may comprise: a plurality of different sensors 110 selected from the group including a visual imager 112, an infrared imager 114, a radar 116, a Doppler radar 116, a laser sensor 118, a laser ranging device 118, an acoustic sensor 122, and an acoustic ranging device 122, the plurality of different sensors 110 having respective fields of view sensing in a predetermined forward looking direction along the track way 60 from the train 50; a locating device 130 including a global positioning device 132, an inertial navigation device 134, or both a global positioning device 132 and an inertial navigation device 134, that independently determines the location of the positive train control unit 100 and represents the location as location data; a processor 120, P to which the plurality of different sensors 110 and the locating device 130 are coupled for receiving the data sensed thereby, wherein the processor 120, P associates the data sensed by the plurality of different sensors 110 with location data and with time data corresponding to a location and a time at which such data is acquired, whereby such data is geo-tagged and time-tagged to the location and time at which it is acquired; a data receiver 140 configured to receive data from a track monitor, or from a switch monitor, or from a wayside monitor, or from a combination thereof, and to couple that data to the processor 120; the processor 120 determining from the data sensed by the plurality of different sensors 110, from the location data, and from data received by the data receiver 140, the location, speed and direction of the positive train control unit 100 relative to predetermined track way 60 configuration data and a train routing order; the processor 120 determining from data sensed by the plurality of different sensors 110, 312 and/or received by the data receiver 140 whether there is an anomaly the track way 60 proximate forward in the direction of travel of the positive train control unit 100; and (1) when the processor 120 determines that the location, speed and/or direction of the positive train control unit 100 differs from the location, speed and/or direction defined in the train routing order, or (2) when the processor 120 determines that there is an anomaly in the track way 60 forward of the positive train control unit 100, or (3) when the processor 120 determines any combination of (1) and (2), then the processor 120 communicates an alert to an alerting device 200 or communicates a control signal to a train control 220 to at least adjust the speed of the train 50 on which the positive train control unit 100 is mounted or both. The positive train control unit 100 may further comprise: a communication device 140, 160 configured to receive the routing order data and the track way 60 configuration data from an external source and to couple that data to the processor 120. The positive train control unit 100 may further comprise: a communication device 160 configured to communicate data from the plurality of different forward looking sensors 110, or location data from the global positioning device 130, 132 and from the inertial navigation device 130, 134, or data received by the data receiver 140 including data from the track monitor 330, from the switch monitor 320, and/or from the wayside monitor 310, to a central train control facility 462. The data from the plurality of different forward looking sensors 110 and the data received by the data receiver 140 including data from the track monitor 330, from the switch monitor 320, and/or from the wayside monitor 310, may be geo-tagged and time-tagged. The track monitor 330 may include a sensor 332 monitoring rail spacing, distortion and/or integrity; or the switch monitor 320 may include a sensor 322 monitoring switch position and switch closure to a fully transferred position; or the wayside monitor 310 may include a plurality of different sensors 110, 312 selected from the group including a visual imager 3112, an infrared imager 3114, a radar 3116, a doppler radar 3116, a laser sensor 3118, a laser ranging device 3118, an acoustic sensor 3122, and an acoustic ranging device 3122, for detecting an object on a track way 60 proximate the wayside monitor 310; or any combination thereof. The control signal to a train control 220 may at least reduce the speed of the train 50 on which the positive train control unit 100 is mounted, and/or may cause the train control 220 to reduce the speed of the train 50 and/or to stop the train 50 in accordance with a predetermined speed reduction profile or with a predetermined safe emergency speed reduction profile, or both. The positive train control unit 100 may further comprise: a locating device 230 mountable at an end of the train 50 remote from the positive train control unit 100, the locating device 230 when mounted at the remote end of the train providing location data of the remote end of the train to the processor 120; and the processor 120 determining the length of the train 0 by comparing the location data from the locating device 230 and the location data from the global positioning device 130, 132 or from the inertial navigation device 130, 132 or from both. The processor 120 may communicate an alert to an alerting device 210 or communicates a control signal to a train control 220 at least to reduce the speed of the train 50 on which the positive train control unit 100 is mounted, or both, in response to the length of the train changing by more than a predetermined difference in length. The locating device 230 mountable at an end of the train 50 remote from the positive train control unit 100 may include a global positioning device 130, 132, an inertial navigation device 130, 134, or both a global positioning device 130, 132 and an inertial navigation device 130, 134.

A positive train control unit 100, 310 for a track way 60 may comprise: a plurality of different sensors 110, 312, selected from the group including a visual imager 3112, an infrared imager 3114, a radar 3116, a doppler radar 3116, a laser sensor 3118, a laser ranging device 3118, an acoustic sensor 3122, and an acoustic ranging device 3122, the plurality of different sensors 110, 312 having respective fields of view sensing at least in a predetermined direction along the track way 60; a first device 130, 3140 providing a representation of the location of the positive train control unit 100, 310 as location data; a processor 3120 to which the plurality of different sensors 110, 312 and the first device 130, 3140 are coupled for receiving the data sensed thereby, wherein the processor 3120 associates the data sensed by the plurality of different sensors 110, 312 with location data and with time data corresponding to a location and a time at which such data is acquired, whereby such data is geo-tagged and time-tagged to the location and time at which it is acquired; a data receiver 3140 configured to receive data from a track monitor 330, or from a switch monitor 320, or from a wayside monitor 310, or from a combination thereof, and to couple that data to the processor 3120; a communication device 3160 configured to communicate at least along the track way 60 proximate the positive train control unit 100, 310; the processor 3120 determining from the data sensed by the plurality of different sensors 110, 312, from the location data, and from data received by the data receiver 3140, the location of the positive train control unit 100, 310 relative to predetermined track way 60 configuration data; the processor 3120 determining from data received from the data sensed by the plurality of different sensors 110, 312, and/or by the data receiver 3140 whether there is an anomaly the track way 60 proximate the positive train control unit 100, 310; and when the processor 3120 determines that there is an anomaly in the track way 60 proximate the positive train control unit 100, 310, then the processor 3120 causes the communication device 3140, 3160 to communicate an alert of an anomaly in the track way 60, whereby a train 50 that is proximate the positive train control unit 100, 310 is alerted to such anomaly in the track way 60 so that the speed of an approaching train 50 can be adjusted. The first device 130, 3140 providing a representation of the location of the positive train control unit 100, 310 may include: a global positioning device 3132 that determines the location of the positive train control unit 100, 310 and that represents the location as location data; or a memory 3120 storing a predetermined location of the positive train control unit 100, 310 as location data; or a global positioning device 3132 that determines the location of the positive train control unit 100, 310 and that represents the location as location data and a memory 3120 storing a predetermined location of the positive train control unit 100, 310 as location data. The communication device 3140, 3160 may be configured to receive track way 60 configuration data from an external source and to couple that data to the processor 3120. The communication device 3140, 3160 may be configured to communicate data from the plurality of different sensors 110, 312, location data and data received by the data receiver 3140 to a central train control facility 462. The data from the plurality of different sensors 110, 312 and data received by the data receiver 3140 may include data from a track monitor 330, from a switch monitor 320, and/or from a wayside monitor 310, may be geo-tagged and time-tagged. The positive train control unit 100, 310 may be in combination with: a track monitor 330 including a sensor 332 monitoring rail spacing, distortion and/or integrity; or a switch monitor 320 including a sensor 322 monitoring switch position and switch closure to a fully transferred position; or a wayside monitor 310; or any combination thereof; and wherein data sensed by the track monitor 330 or by the switch monitor 320 or by the wayside monitor 310 or by any combination thereof is communicated to the processor 3120. The data from the plurality of different sensors 110, 312 and the data received by the data receiver 3140 including data from the track monitor 330, from the switch monitor 320, and/or from the wayside monitor 310, may be geo-tagged and time-tagged. The control signal for activating a train control 220 on a train 50 may cause the train control 220 to reduce the speed of the train 50 and/or stop the train 50 in accordance with a predetermined speed reduction profile or with a predetermined safe emergency speed reduction profile, or both. A crossing 62 of the track way 60 may be within the respective fields of view of the plurality of different sensors 110, 312, whereby vehicles 64 and other objects 64 on or crossing the track way 60 are identified by the positive train control unit 100, 310 and are communicated by the communication device 3140, 3160.

A positive train control unit 100, 310 for a track way 60 crossing may comprise: a plurality of different sensors 110, 312 selected from the group including a visual imager 3112, an infrared imager 3114, a radar 3116, a doppler radar 3116, a laser sensor 3118, a laser ranging device 3118, an acoustic sensor 3122, and an acoustic ranging device 3122, the plurality of different sensors 110, 312 having respective fields of view sensing at least in a predetermined direction along the track way 60 including a crossing 62 thereof; a first device 130, 3140 providing a representation of the location of the positive train control unit 100, 310 as location data; a processor 3120 to which the plurality of different sensors 110, 312 and the first device 130, 3140 are coupled for receiving the data sensed thereby, wherein the processor 3120 associates the data sensed by the plurality of different sensors 110, 312 with location data and with time data corresponding to a location and a time at which such data is acquired, whereby such data is geo-tagged and time-tagged to the location and time at which it is acquired; a data receiver 3140, 3160 configured to receive data from a track monitor 330, or from a switch monitor 320, or from a wayside monitor 310, or from a combination thereof, and to couple that data to the processor 3120; a communication device 3140, 3160 configured to communicate at least along the track way 60 proximate the positive train control unit 100, 310; the processor 3120 determining from the data sensed by the plurality of different sensors 110, 312, from the location data, and from data received by the data receiver 3140, the location of the positive train control unit 100, 310 relative to predetermined track way 60 configuration data; the processor 3120 determining from the data sensed by the plurality of different sensors 110, 312 whether there is an object 64 on the track way 60 and/or the crossing 62 thereof proximate the positive train control unit 100, 310; and the processor 3120 determining from data sensed by the plurality of different sensors 110, 312 and/or received by the data receiver 3140, 3160 whether there is an anomaly the track way 60 proximate the positive train control unit 100, 310; and when the processor 3120 determines that there is an anomaly in the track way 60 proximate the positive train control unit 100, 310, then the processor 3120 causes the communication device 3140, 3160 to communicate an alert of an anomaly in the track way 60, whereby a train 50 that is proximate the positive train control unit 100, 310 is alerted to such anomaly in the track way 60 and/or the crossing 62 thereof so that the speed of an approaching train 50 can be adjusted. The first device 130, 3140 providing a representation of the location of the positive train control unit 100, 310 may include: a global positioning device 3132 that determines the location of the positive train control unit 100, 310 and that represents the location as location data; or a memory storing 3120 a predetermined location of the positive train control unit 100, 310 as location data; or a global positioning device 3132 that determines the location of the positive train control unit 100, 310 and that represents the location as location data and a memory 3120 storing a predetermined location of the positive train control unit 100, 310 as location data. The positive train control unit 100, 310 may further comprise a data receiver 3140 configured to receive data from a track monitor 330, or from a switch monitor 320, or from a track monitor 330 and a switch monitor 320, and to couple that data to the processor 3120. The positive train control unit 100, 310 may further comprise: a communication device 3140, 3160 configured to receive track way 60 configuration data from an external source and to couple that data to the processor 3120. The communication device 3140, 3160 may be configured to communicate data from the plurality of different sensors 110, 312 and location data to a central train control facility 462. The positive train control unit 100, 310 may be in combination with: a track monitor 330 including a sensor 332 monitoring rail spacing, distortion and/or integrity; or a switch monitor 320 including a sensor 322 monitoring switch position and switch closure to a fully transferred position; or a wayside monitor 310; or any combination thereof; and wherein data sensed by the track monitor 330 or by the switch monitor 320 or by the wayside monitor 310 or by any combination thereof is communicated to the processor 3120. The data from the plurality of different sensors 110, 312 and the data received by the data receiver 3140, 3160 including data from the track monitor 330, from the switch monitor 320, and/or from the wayside monitor 310, may be geo-tagged and time-tagged. The control signal for activating a train control 220 on a train 50 may cause the train control 220 to reduce the speed of the train 50 and/or stop the train 50 in accordance with a predetermined speed reduction profile or with a predetermined safe emergency speed reduction profile, or both.

A positive train control unit 100, 320, 330 for a track way 60 may comprise: an elongated member 324, 334 attached at a first end to a first rail of a track way 60 and having a second end; a probe 324P, 334P near the second end of the elongated member 324, 334 at a predetermined distance from the first end thereof; a sensor device 322, 332 attached to a second rail of the track way 60, the second end of the elongated member 324, 334 extending into the sensor device 322, 332, the sensor device 322, 332 including a position sensor 324P, 334P, 326, 328 for sensing the position of the probe 324P, 334P, the position sensor 324P, 334P, 326, 328 including: a surface having a pattern 326, 328 thereon wherein the surface 326, 328 pattern defines positions in one dimension or in two dimensions relative to the sensor device 322, 332; wherein the probe 324P, 334P near the second end of the elongated member 324, 334 and the surface pattern 326, 328 of the position sensor 324P, 334P, 326, 328 cooperate to determine the relative position of the probe 324P, 334P and the surface pattern 26, 328, and thereby to determine the position of the elongated member 324, 334 relative to the sensor device 322, 332; whereby the probe 324P, 334P of the elongated member 324, 334 and the surface pattern 326, 328 of the position sensor 324P, 334P, 326, 328 cooperate to define the position of the first rail relative to the second rail. The first rail and the second rail may include a stock rail 60R and a switch rail 60C of a switch 60S, and the relative position determined by the probe 324P. 334P and the surface pattern 326, 328 is that of the switch rail 60C relative to the stock rail 60R. The first rail and the second rail may include a pair of substantially parallel stock rails, and the relative position determined by the probe and the surface pattern is that of the first stock rail relative to the second stock rail. The elongated member 324, 334 may be attached to the first stock rail 60R at a location that is displaced longitudinally along the track way 60 relative to the location at which the sensor device 322, 332 is attached to the second stock rail 60R, whereby the relative position determined by the probe 324P, 326P and the surface pattern 326, 328 represents separation of the first and second stock rails 60R, longitudinal displacement of the first stock rail 60R relative to the second stock rail 60R, or both. The surface pattern 326, 328 may include a plurality of adjacent electrically conductive contacts 326C in predetermined locations on the surface, and wherein the probe 324P, 326P includes an electrical contact configured to make electrical contact with ones of the plurality of electrically conductive contacts 324P, 326C of the surface pattern 326, 328, whereby the position of the probe 324P, 334P relative to the surface pattern 326, 328 is indicated by the one of the plurality of electrically conductive contacts 324P, 326C that is in electrical contact with the probe 324P, 334P. The surface pattern 326, 328 may include a plurality of adjacent discernable areas in adjacent locations on the surface, and wherein the probe 324P, 334P includes movement sensing elements of a computer mouse configured to discern the discernable areas, whereby the position of the probe 324P, 334P relative to the surface pattern 326, 328 is indicated by movement of the operable elements of the computer mouse relative to the plurality of discernable areas. The surface pattern 326, 328 may include a plurality of adjacent physically discernable features on the surface, and the probe 324P, 334P may include movement sensing elements of a rolling ball type of computer mouse; or the surface pattern 326, 328 may include a plurality of adjacent optically discernable features on the surface, and the probe 324P, 334P may include movement sensing elements of an optical type of computer mouse. The pattern 326, 328 on the surface of the position detector 322, 332 may include a plurality of photo-detectors 328 in adjacent locations on the surface, the position sensor including and at least one light emitter, and the probe 324P, 334P may include: one or more optically reflective areas positioned on the probe 324P, 334P to reflect light from the light emitter towards the plurality of photo-detectors 328, whereby the position of the one or more optically reflective areas of the probe 324P, 334P relative to the plurality of photo-detectors 328 indicates the position of the probe 324P, 334P relative to the sensor device 322, 332; or one or more optically transmissive features positioned on the probe 324P, 334P to permit transmission of light from the light emitter towards the plurality of photo-detectors 328, whereby the position of the one or more optically transmissive features of the probe 324P, 334P relative to the plurality of photo-detectors 328 indicates the position of the probe 324P, 334P relative to the sensor device 322, 332; or a combination thereof The probe 324P, 334P may include a baffle and the one or more optically transmissive features may be provided by one or more apertures through the baffle.

A positive train control method 400, 800 for a train 50 movable on a track way 60 may comprise: receiving sensor data from a plurality of different sensors 110, 312 selected from the group including a visual imager 112, 3112, an infrared imager 114, 3114, a radar 116, 3116, a doppler radar 116, 3116, a laser sensor 118, 3118, a laser ranging device 118, 3118, an acoustic sensor 122, 3122, and an acoustic ranging device 122, 3122, the plurality of different sensors 110, 312 having respective fields of view sensing in a predetermined forward looking direction along the track way 60 from the train 50; receiving location data from a locating device 130 including a global positioning device 132, an inertial navigation device 134, or both a global positioning device 132 and an inertial navigation device 134, that independently determines the location of the train 50; associating the sensor data received from the plurality of different sensors 110, 312 with location data and with time data corresponding to a location and a time at which such data is acquired, whereby such sensor data is geo-tagged and time-tagged to the location and time at which it is acquired; receiving data from a track monitor 330, or from a switch monitor 320, or from a wayside monitor 310, or from a combination thereof, if within range of such track monitor 330, switch monitor 320, wayside monitor 310, or combination thereof determining from the sensor data sensed by the plurality of different sensors 110, 312 and from the location data, the location, speed and direction of the train 50 relative to predetermined track way configuration data and a train routing order; determining from the sensor data sensed by the plurality of different sensors 110, 312 whether there is an anomaly in the track way 60 forward in the direction of travel of the train 50; determining from data received from such track monitor 330, switch monitor 320, wayside monitor 310, or combination thereof, whether there is an anomaly in the track way 60 proximate forward in the direction of travel of the train 50; and (1) when determined that the location, speed and/or direction of the train 50 differs from the location, speed and/or direction defined in the train routing order, or (2) when determined that there is an anomaly in the track way 60 forward of the train 50, or (3) when any combination of (1) and (2) is determined, then communicating an alert to an alerting device 200, 210 or communicating a control signal for a train control 200, 220, or both. The positive train control method 400, 800 may further comprise: receiving train routing order data and track way configuration data from an external source. The positive train control method 400, 800 may further comprise: communicating sensor data from the plurality of different forward looking sensors 110, 312, or location data from the global positioning device 130, 132 and from the inertial navigation device 130, 134, or data received from the track monitor 330, from the switch monitor 320, and/or from the wayside monitor 310, to a central train control facility. The data from the plurality of different forward looking sensors 110, 312 and data received from the track monitor 330, from the switch monitor 320, and/or from the wayside monitor 310, are geo-tagged and time-tagged. The control signal communicated for a train control 200, 220 causes the train control 220 to reduce the speed of the train 50 and/or to stop the train 50 in accordance with a predetermined speed reduction profile or with a predetermined safe emergency speed reduction profile, or both. When the location data is for a first end 52, 100 of the train 50, the method 400, 800 may further comprise: receiving location data for a second end 230 of the train 50 that is remote from the first end 52, 100 of the train 50; determining the length of the train 50 by comparing the location data for the first end 52, 100 of the train 50 and the location data for the second end 230 of the train 50; and if the length of the train 50 changes by more than a predetermined difference in length, then: communicating an alert to an alerting device 200, 210 or communicating a control signal to a train control 200, 220 to at least to reduce the speed of the train 50, or both.

A positive train control unit 320, 330 for a track way 60 may comprise: a sensor device 322, 332 for a switching system 60S having switch rails and stock rails, the sensor device 322, 332 configured to provide a positive indication of the position of the switch rails 60C relative to the stock rails 60R independently of the switching system 60S, the sensor device 322, 332 including a one or more position sensors 324P, 334P, 326,328 and probes 324P, 334P configured to determine switch closure by the switch rails being in intimate contact with one or the other of the stock rails by direct contact measurement; and a communication device 3140, 3160 coupled to the sensor device 322, 332 and configured to communicate the positive indication of the position and closure of the switch rails to the one or the other stock rails to a remote receiver, whereby the closure of the switch rails to the stock rails, or the lack thereof, can be communicated to a receiver at a monitoring center and/or to a receiver on a train within range. The positive train control unit 320, 330 may further include: a second sensor device 322, 332 configured to provide a positive indication of the position of a second of the at least one of the switch rails relative to an adjacent second one of the stock rails independently of the switching system, whereby the closure of lack thereof of either one or none of the stock rails to a monitoring center and/or to trains within range. The communication device 3140, 3160 may communicate the positive indication: by a wireless communication device 3140, 3160 including a 220 MHz communication device 3140, 3160, a WiFi network, an ad hoc network, cellular communication, a bluetooth device, an RFID device, or by any combination thereof; or to a positive train control unit 100 on a train, to a wayside monitor 310, to a switch monitor 320, 330, to a track monitor 320,330, to a central train facility or to any combination thereof; or by a wireless communication device 3140, 3160 including a 220 MHz communication device 3140, 3160, a WiFi network, an ad hoc network, cellular communication, a bluetooth device, an RFID device, or by any combination thereof, to a positive train control unit on a train, to a wayside monitor 310, to a switch monitor 320, 330, to a track monitor 320, 330, to a central train facility or to any combination thereof. The one or more position sensors 324P, 334P, 326,328 may each comprise: a surface having a pattern 326, 328 thereon associated with the stock rail, wherein the surface pattern 326, 328 defines positions in one dimension or in two dimensions relative to the stock rail; the probe 324P, 334P associated with the switch rail configured to be near the surface pattern 326, 328 of the position sensor 324P, 334P, 326,328 to cooperate to determine the position of the probe 324P, 334P relative to the surface pattern 326, 328, and thereby to determine the position of the switch rail relative to the stock rail; whereby the probe 324P, 334P and the surface pattern 326, 328 of the position sensor 324P, 334P, 326,328 cooperate to define the position of the switch rail relative to the stock rail. The surface pattern 326, 328 may include a plurality of adjacent electrically conductive contacts 324P, 326P in predetermined locations on the surface, and wherein the probe 324P, 334P includes an electrical contact configured to make electrical contact with ones of the plurality of electrically conductive contacts of the surface pattern, whereby the position of the probe 324P, 334P relative to the surface pattern is indicated by the one of the plurality of electrically conductive contacts that is in electrical contact with the probe 324P, 334P. The surface pattern 326, 328 may include a plurality of adjacent discernable areas in adjacent locations on the surface, and the probe 324P, 334P may include movement sensing elements of a computer mouse configured to discern the discernable areas, whereby the position of the probe 324P, 334P relative to the surface pattern is indicated by movement of the operable elements of the computer mouse relative to the plurality of discernable areas. The surface pattern 326, 328 may include a plurality of adjacent physically discernable features on the surface, and the probe 324P, 334P may include movement sensing elements of a rolling ball type of computer mouse; or the surface pattern 326, 328 may include a plurality of adjacent optically discernable features on the surface, and the probe 324P, 334P may include movement sensing elements of an optical type of computer mouse. The pattern on the surface of the position detector 324P, 334P, 326, 328 may include a plurality of photo-detectors in adjacent locations on the surface, the position sensor 324P, 334P, 326,328 including and at least one light emitter, and wherein the probe 324P, 334P includes: one or more optically reflective areas positioned on the probe 324P, 334P to reflect light from the light emitter towards the plurality of photo-detectors, whereby the position of the one or more optically reflective areas of the probe 324P, 334P relative to the plurality of photo-detectors indicates the position of the probe 324P, 334P relative to the sensor device 322, 332; or one or more optically transmissive features positioned on the probe 324P, 334P to permit transmission of light from the light emitter towards the plurality of photo-detectors, whereby the position of the one or more optically transmissive features of the probe 324P, 334P relative to the plurality of photo-detectors indicates the position of the probe 324P, 334P relative to the sensor device 322, 332; or a combination thereof The probe 324P, 334P may include a baffle and the one or more optically transmissive features may be provided by one or more apertures through the baffle.

A control unit 100, 310 for a right of way 60 crossing may comprise: a plurality of different sensors 110, 312 selected from the group including a visual imager 3112, an infrared imager 3114, a radar 3116, a doppler radar 3116, a laser sensor 3118, a laser ranging device 3118, an acoustic sensor 3122, and an acoustic ranging device 3122, the plurality of different sensors 110, 312 having respective fields of view sensing at least in a predetermined direction along the right of way 60; a first device 130, 3140 providing a representation of the location of the control unit 100, 310 as location data; a processor 3120 to which the plurality of different sensors 110, 312 and the first device 130, 3140 are coupled for receiving the data sensed thereby, wherein the processor 3120 associates the data sensed by the plurality of different sensors 110, 312 with location data and with time data corresponding to a location and a time at which such data is acquired, whereby such data is geo-tagged and time-tagged to the location and time at which it is acquired; a data receiver 3140, 3160 configured to receive data from a wayside monitor 310, and to couple that data to the processor 3120; a communication device 3140, 3160 configured to communicate at least along the right of way 60 proximate the control unit 100, 310; the processor 3120 determining from the data sensed by the plurality of different sensors 110, 312, from the location data, and from data received by the data receiver 3140, the location of the control unit 100, 310 relative to predetermined right of way 60 configuration data; and the processor 3120 determining from data sensed by the plurality of different sensors 110, 312 and/or received by the data receiver 3140, 3160 whether there is an anomaly the right of way 60 proximate the control unit 100, 310; and when the processor 3120 determines that there is an anomaly in the right of way 60 proximate the control unit 100, 310, then the processor 3120 causes the communication device 3140, 3160 to communicate an alert of an anomaly in the right of way 60, whereby an alert of an anomaly in the right of way is communicated. The first device 130, 3140 providing a representation of the location of the control unit 100, 310 may include: a global positioning device 3132 that determines the location of the control unit 100, 310 and that represents the location as location data; or a memory storing 3120 a predetermined location of the control unit 100, 310 as location data; or a global positioning device 3132 that determines the location of the control unit 100, 310 and that represents the location as location data and a memory 3120 storing a predetermined location of the control unit 100, 310 as location data. The control unit 100, 310 may further comprise a data receiver 3140 configured to receive data from a wayside monitor 310, and to couple that data to the processor 3120. The control unit 100, 310 may further comprise: a communication device 3140, 3160 configured to receive right of way 60 configuration data from an external source and to couple that data to the processor 3120. The communication device 3140, 3160 may be configured to communicate data from the plurality of different sensors 110, 312 and location data to a central control facility 462. The control unit 100, 310 may be in combination with: a wayside monitor 310; and wherein data sensed by the wayside monitor 310 is communicated to the processor 3120. The data from the plurality of different sensors 110, 312 and the data received by the data receiver 3140, 3160 including data from the wayside monitor 310, may be geo-tagged and time-tagged. The control unit 100, 310 may further comprise a structure configured to support the control unit 100, 310 above a fixed location proximate the right of way 60. The right of way 60 may include: any way or structure that guides or otherwise limits the degrees of freedom of the travel of a train and/or other vehicle thereon, including a track, a railway whether of one or two or more rails, railways of standard, narrow or any other gauge, a guide and/or guideway, an electrically controlled guideway, a magnetically levitated guide and/or guideway, a road and/or roadway, an electrically controlled road and/or roadway, a monorail, a canal, a channel, and any combination of the foregoing.

A positive train control system for a train 50 movable on a track way 60 may comprise: one or more switch monitors 320 disposed at one or more locations along a track way proximate a switch of the track way, or one or more track monitors 330 disposed at one or more locations proximate a track of the track way, or a combination thereof; each of the switch monitors 320 includes a sensor providing sensor data relating to a physical condition of one or more switches of the track way proximate to the switch monitor and includes a communication device for transmitting the switch monitor sensor data and switch monitor location data representative of the location of the switch monitor; a processor 120 is configured to receive and process the switch monitor sensor data and the switch monitor location data to determine when there is an anomaly of the switch and the location thereof; each of the track monitors 330 includes a sensor providing sensor data relating to a physical condition of one or more tracks of the track way proximate to the track monitor and includes a communication device for transmitting the track monitor sensor data and track monitor location data representative of the location of the track monitor; the processor 120 is configured to receive and process the track monitor sensor data and track monitor location data to determine when there is an anomaly of the track and the location thereof; the processor 120 generates a message, alert and/or warning when an anomaly of the switch and/or an anomaly of the track is determined; and an operator alert device 210 on the train is responsive to the message, alert and/or warning for providing a human perceivable representation of the message, alert and/or warning; wherein the processor communicates the message, alert and/or warning to the operator alert device 210 on the train, or communicates a control signal to a train control 220 to at least adjust the speed of the train, or communicates the message, alert and/or warning to a remote location, or communicates any combination of the foregoing. The processor 120 may be on the train and may further comprise: a data receiver on the train configured to receive sensor data and location data transmitted from a switch monitor and/or from a track monitor, and to couple the received sensor data and location data to the processor. The processor may be at the remote location and may further comprise: a receiver at the remote location configured to receive sensor data and location data transmitted from a switch monitor and/or from a track monitor, and to couple the received sensor data and location data to the processor. The positive train control system may further comprise: a transmitter at the remote location for transmitting the message, alert and/or warning; and a receiver on the train configured to receive the message, alert and/or warning and to couple the received message, alert and/or warning to the operator alert device or to the train control or to both the operator alert device and the train control. The sensor of the switch monitor 320 provides sensor data representative of a physical distance between a switch closure rail and a stock rail, or of a physical position of a switch closure rail relative to a stock rail, or both. The resolution of the sensor of the switch monitor 320 enables evaluation of operational tolerances of the switch relative to a predetermined specification therefor. The sensor of the track monitor 330 provides sensor data representative of a physical spacing between stock rails, or of alignment of a stock rail relative to another stock rail, or of relative movement of one stock rail relative to another stock rail, or of physical distortion of a stock rail, or any combination of the foregoing. The resolution of the sensor of the track monitor 330 enables evaluation of operational tolerances of the track relative to a predetermined specification therefor. The communication device of the switch monitor 320 or the communication device of the track monitor, or both, communicates sensor data to a receiver on a train, to a receiver at a remote location, or both. The sensor data received by the receiver on a train is displayed on the operator alert device 210 on the train, or is coupled to the processor 120 and when an anomaly is determined, is coupled to the train control 220 and/or is communicated to the remote location, or any combination of the foregoing. The positive train control system may further comprise: one or more wayside monitors 310 disposed along the track way, each wayside monitor 310 including one or more sensors providing sensor data representative of a physical condition of the track way proximate the wayside monitor, and a communication device for transmitting the sensor data of the one or more sensors of the wayside monitor. The processor 120 receives the sensor data transmitted by the communication device of the wayside monitor, determines when there is an anomaly of the track way, and generates a message, alert and/or warning when an anomaly on the track way is determined.

A positive train control method for a train 50 movable on a track way 60 may comprise: disposing one or more switch monitors 320 at one or more locations along a track way proximate a switch of the track way, or disposing one or more track monitors 330 at one or more locations proximate a track of the track way, or a combination thereof; for each of the switch monitors 320, providing sensor data relating to a physical condition of one or more switches of the track way proximate to the switch monitor and transmitting the switch monitor sensor data and switch monitor location data representative of the location of the switch monitor; receiving and processing the switch monitor sensor data and the switch monitor location data to determine when there is an anomaly of the switch and the location thereof; for each of the track monitors 330, providing sensor data relating to a physical condition of one or more tracks of the track way proximate to the track monitor and transmitting the track monitor sensor data and track monitor location data representative of the location of the track monitor; receiving and processing the track monitor sensor data and the track monitor location data to determine when there is an anomaly of the track and the location thereof; generating a message, alert and/or warning when an anomaly of the switch and/or an anomaly of the track is determined; and providing a human perceivable representation of the message, alert and/or warning via an operator alert device 210 on the train responsive to the message, alert and/or warning; communicating the message, alert and/or warning to the operator alert device 210 on the train, or communicating a control signal to a train control 220 to at least adjust the speed of the train, or communicating the message, alert and/or warning to a remote location, or communicating any combination of the foregoing. The positive train control method may further comprise: receiving on the train sensor data and location data transmitted from a switch monitor 320 and/or from a track monitor 330, wherein the processing of the received sensor data and location data is performed on the train. The positive train control method may further comprise: receiving at the remote location sensor data and location data transmitted from a switch monitor 320 and/or from a track monitor 330, wherein the processing of the received sensor data and location data is performed at the remote location. The positive train control method may further comprise: transmitting the message, alert and/or warning from the remote location; receiving on the train the message, alert and/or warning; and coupling the received message, alert and/or warning to the operator alert device 210 or to the train control 220 or to both the operator alert device and the train control. The positive train control method may further include the switch monitor 330 providing sensor data representative of a physical distance between a switch closure rail and a stock rail, or of a physical position of a switch closure rail relative to a stock rail, or both. The resolution of the sensor data of the switch monitor 320 enables evaluation of operational tolerances of the switch relative to a predetermined specification therefor. The positive train control method may further include the track monitor 330 providing sensor data representative of a physical spacing between stock rails, or of alignment of a stock rail relative to another stock rail, or of relative movement of one stock rail relative to another stock rail, or of physical distortion of a stock rail, or any combination of the foregoing. The resolution of the sensor data of the track monitor 330 enables evaluation of operational tolerances of the track relative to a predetermined specification therefor. The positive train control method may further comprise communicating sensor data of the switch monitor 320 or communicating sensor data of the track monitor 330, or both, to a receiver on a train, to a receiver at a remote location, or both. The sensor data may be received on a train, and the method may further comprise displaying the sensor data on an operator alert device 210 on the train, or determining when the sensor data represents an anomaly and coupling the anomaly representation to the train control 220 and/or to the remote location, or any combination of the foregoing. The positive train control method may further comprise: providing sensor data from one or more wayside monitors 310 disposed along the track way, each wayside monitor 310 providing sensor data of one or more sensors thereof representative of a physical condition of the track way proximate the wayside monitor, and transmitting the sensor data of the one or more sensors of the wayside monitor. The positive train control method may further comprise receiving the sensor data transmitted by the of the wayside monitor 310, determining when there is an anomaly of the track way, and generating a message, alert and/or warning when an anomaly on the track way is determined.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate"whether or not expressly stated to be such. It is noted that embodiments of very different sizes, shapes and dimensions may employ the described arrangements.

As used herein a "train" is intended to include any vehicle or vehicles that are movable on or along a "track" or "track way," irrespective of the length of the "track way," including but not limited to, a railroad train of one or more carriages and/or one or more locomotive units, whether integral to one or more carriages or separate therefrom, and irrespective of the service engaged in whether long distance, regional, local and/or commuter, passenger and/or freight, tracked and trackless trolleys, monorail vehicles, light rail vehicles, magnetically levitated vehicles, motor vehicles, autonomous vehicles, and any other similar vehicles. A train may be operated autonomously, with or without human backup, or by an engineer or other on-board operator, or by an operator or other controller located remotely from the train, or by any combination thereof.

As used herein, a "track" or "track way" is intended to include any way or structure that guides or otherwise limits the degrees of freedom of the travel of a "train" thereon, including but not limited to, a track, a railway whether of one or two or more rails, railways of standard, narrow or any other gauge, a guide and/or guideway, an electrically controlled guideway, a magnetically levitated guide and/or guideway, a road and/or roadway, an electrically controlled road and/or roadway, a monorail, a canal, a channel, and the like. Typically, a "track" or "track way" limits or is intended to limit movement of a train substantially to one dimension, e.g., forward and backward, although there may be limited permitted movement in another dimension, e.g., side-to-side and/or up-and-down. A "track way" is usually referred to herein simply as a "track," and the terms are considered to be substantially equivalent and interchangeable.

As used herein, "positive train control unit" refers to one or more physical units or modules that contain the various sensors and other equipment thereof as described herein or to the various sensors and other equipment described herein when connected so as to be operable as a positive train control unit as described herein. A collection of connected sensors and other equipment integrated into a train, e.g., into an engine or locomotive therefor, is considered to be a positive train control unit when connected so as to be operable as a positive train control unit as described herein.

As used herein, an "anomaly" of a rail and/or of a track way includes any condition where the physical spacing and/or alignment and/or completeness of a transfer of a switch rail of a track way is not within prescribed configuration and/or tolerances, or where the physical spacing and/or alignment of a track way and/or of the rails of a track way is not within a prescribed configuration and/or tolerances.

GPS is used herein to refer to the United States' Global Positioning System and its satellite constellation as well as to any other radio communication based geographical position or location determining and/or navigation systems and aids, including but not limited to the Russian Glonass, the Galileo, the IRNSS and/or the BEIDOU-2 systems.

Although terms such as "up," "down," "left," "right," "up," "down," "front," "rear," "side," "end," "top," "bottom," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

Further, what is stated as being "optimum" or "deemed optimum" may or may not be a true optimum condition, but is the condition deemed to be desirable or acceptably "optimum" by virtue of its being selected in accordance with the decision rules and/or criteria defined by the designer and/or applicable controlling function, e.g., the moving block limitation may be adjusted dynamically depending upon weather and other conditions that may affect visibility, precipitation and other wetness that may affect braking ability and/or stopping distances, and any other condition or conditions that may affect operation so as to make dynamic adjustment of the moving block desirable under such condition or conditions.

The term battery is used herein to refer to an electrochemical device comprising one or more electro-chemical cells and/or fuel cells, and so a battery may include a single cell or plural cells, whether as individual units or as a packaged unit. A battery is one example of a type of an electrical power source suitable for a portable device. Other devices could include fuel cells, super capacitors, solar cells, and the like. Any of the foregoing may be intended for a single use or for being rechargeable or for both While the present invention has been described in terms of the foregoing example embodiments, variations within the scope and spirit of the present invention as defined by the claims following will be apparent to those skilled in the art. For example, the number and/or types of sensors 110, 312 of a positive train control unit 100 and/or of a wayside unit 310 may be augmented in applications wherein there is a need for an additional sensor and/or may be reduced in applications wherein there is no need for a particular sensor.

Similarly, the types and kinds of communications equipment 140, 160, 3140, 3160 that may be provided may be augmented and/or reduced consistent with the needs and desires applicable to a particular application. For example, if a wayside monitor 310 or switch monitor 320 or track monitor 330 were to be located in a remote location, e.g., far away form other electronic equipment, then only longer range communication devices need be provided While certain features may be described as a raised feature, e.g., a ridge, boss, flange, projection or other raised feature, such feature may be positively formed or may be what remains after a recessed feature, e.g., a groove, slot, hole, indentation, recess or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A positive train control system for a train movable on a track way comprising:
    one or more switch monitors disposed at one or more locations along a track way proximate a switch of the track way, or one or more track monitors disposed at one or more locations proximate a track of the track way, or a combination thereof;
    each of said switch monitors including a sensor providing sensor data relating to a physical dimension of one or more switches of the track way proximate to the switch monitor and including a communication device for transmitting the switch monitor sensor data and switch monitor location data representative of the location of the switch monitor;

a processor configured to receive and process the switch monitor sensor data and the switch monitor location data to determine when there is an anomaly of the switch and the location thereof;

each of said track monitors including a sensor providing sensor data relating to a physical dimension of one or more tracks of the track way proximate to the track monitor and including a communication device for transmitting the track monitor sensor data and track monitor location data representative of the location of the track monitor;

said processor configured to receive and process the track monitor sensor data and track monitor location data to determine when there is an anomaly of the track and the location thereof;

said processor generating a message, alert and/or warning when an anomaly of the switch and/or an anomaly of the track is determined; and an operator alert device on the train responsive to the message, alert and/or warning for providing a human perceivable representation of the message, alert and/or warning;

wherein said processor communicates the message, alert and/or warning to the operator alert device on the train, or communicates a control signal to a train control to at least adjust the speed of the train, or communicates the message, alert and/or warning to a remote location, or communicates any combination of the foregoing.

2. The positive train control system of claim 1 wherein said processor is on the train and further comprising: a data receiver on the train configured to receive sensor data and location data transmitted from a switch monitor and/or from a track monitor, and to couple the received sensor data and location data to said processor.

3. The positive train control system of claim 1 wherein said processor is at the remote location and further comprising: a receiver at the remote location configured to receive sensor data and location data transmitted from a switch monitor and/or from a track monitor, and to couple the received sensor data and location data to said processor.

4. The positive train control system of claim 3 further comprising: a transmitter at the remote location for transmitting the message, alert and/or warning; and a receiver on the train configured to receive the message, alert and/or warning and to couple the received message, alert and/or warning to said operator alert device or to the train control or to both the operator alert device and the train control.

5. The positive train control system of claim 1 wherein the sensor of said switch monitor provides sensor data representative of a physical distance between a switch closure rail and a stock rail, or of a physical position of a switch closure rail relative to a stock rail, or both.

6. The positive train control system of claim 5 wherein the resolution of the sensor of said switch monitor enables evaluation of operational tolerances of the switch relative to a predetermined specification therefor.

7. The positive train control system of claim 1 wherein the sensor of said track monitor provides sensor data representative of a physical spacing between stock rails, or of alignment of a stock rail relative to another stock rail, or of relative movement of one stock rail relative to another stock rail, or of physical distortion of a stock rail, or any combination of the foregoing.

8. The positive train control system of claim 7 wherein the resolution of the sensor of said track monitor enables evaluation of operational tolerances of the track relative to a predetermined specification therefor.

9. The positive train control system of claim 1 wherein said communication device of said switch monitor or said communication device of said track monitor, or both, communicates sensor data to a receiver on a train, to a receiver at a remote location, or both.

10. The positive train control system of claim 9 wherein the sensor data received by the receiver on a train is displayed on said operator alert device on the train, or is coupled to said processor and when an anomaly is determined, is coupled to the train control and/or is communicated to the remote location, or any combination of the foregoing.

11. The positive train control system of claim 1 further comprising: one or more wayside monitors disposed along the track way, each wayside monitor including one or more sensors providing sensor data representative of a physical condition of the track way proximate said wayside monitor, and a communication device for transmitting the sensor data of the one or more sensors of said wayside monitor.

12. The positive train control system of claim 11 wherein said processor receives the sensor data transmitted by the communication device of said wayside monitor, determines when there is an anomaly of the track way, and generates a message, alert and/or warning when an anomaly on the track way is determined.

13. A positive train control method for a train movable on a track way comprising:

disposing one or more switch monitors at one or more locations along a track way proximate a switch of the track way, or disposing one or more track monitors at one or more locations proximate a track of the track way, or a combination thereof;

for each of the switch monitors, providing sensor data relating to a physical dimension of one or more switches of the track way proximate to the switch monitor and transmitting the switch monitor sensor data and switch monitor location data representative of the location of the switch monitor;

receiving and processing the switch monitor sensor data and the switch monitor location data to determine when there is an anomaly of the switch and the location thereof;

for each of the track monitors, providing sensor data relating to a physical dimension of one or more tracks of the track way proximate to the track monitor and transmitting the track monitor sensor data and track monitor location data representative of the location of the track monitor;

receiving and processing the track monitor sensor data and the track monitor location data to determine when there is an anomaly of the track and the location thereof;

generating a message, alert and/or warning when an anomaly of the switch and/or an anomaly of the track is determined; and providing a human perceivable representation of the message, alert and/or warning via an operator alert device on the train responsive to the message, alert and/or warning;

communicating the message, alert and/or warning to the operator alert device on the train, or communicating a control signal to a train control to at least adjust the speed of the train, or communicating the message, alert and/or warning to a remote location, or communicating any combination of the foregoing.

14. The positive train control method of claim 13 further comprising: receiving on the train sensor data and location data transmitted from a switch monitor and/or from a track monitor, wherein the processing of the received sensor data and location data is performed on the train.

15. The positive train control method of claim 13 further comprising: receiving at the remote location sensor data and location data transmitted from a switch monitor and/or from a track monitor, wherein the processing of the received sensor data and location data is performed at the remote location.

16. The positive train control method of claim 15 further comprising:
   transmitting the message, alert and/or warning from the remote location;
   receiving on the train the message, alert and/or warning; and
   coupling the received message, alert and/or warning to the operator alert device or to the train control or to both the operator alert device and the train control.

17. The positive train control method of claim 13 further including the switch monitor providing sensor data representative of a physical distance between a switch closure rail and a stock rail, or of a physical position of a switch closure rail relative to a stock rail, or both.

18. The positive train control method of claim 17 wherein the resolution of the sensor data of the switch monitor enables evaluation of operational tolerances of the switch relative to a predetermined specification therefor.

19. The positive train control method of claim 13 further including the track monitor providing sensor data representative of a physical spacing between stock rails, or of alignment of a stock rail relative to another stock rail, or of relative movement of one stock rail relative to another stock rail, or of physical distortion of a stock rail, or any combination of the foregoing.

20. The positive train control method of claim 19 wherein the resolution of the sensor data of the track monitor enables evaluation of operational tolerances of the track relative to a predetermined specification therefor.

21. The positive train control method of claim 13 further comprising communicating sensor data of the switch monitor or communicating sensor data of the track monitor, or both, to a receiver on a train, to a receiver at a remote location, or both.

22. The positive train control method of claim 21 wherein the sensor data is received on a train, the method further comprising displaying the sensor data on an operator alert device on the train, or determining when the sensor data represents an anomaly and coupling the anomaly representation to the train control and/or to the remote location, or any combination of the foregoing.

23. The positive train control method of claim 13 further comprising: providing sensor data from one or more wayside monitors disposed along the track way, each wayside monitor providing sensor data of one or more sensors thereof representative of a physical condition of the track way proximate the wayside monitor, and transmitting the sensor data of the one or more sensors of the wayside monitor.

24. The positive train control method of claim 23 further comprising receiving the sensor data transmitted by the of the wayside monitor, determining when there is an anomaly of the track way, and generating a message, alert and/or warning when an anomaly on the track way is determined.

* * * * *